United States Patent
Lasang et al.

(10) Patent No.: US 8,547,442 B2
(45) Date of Patent: Oct. 1, 2013

(54) METHOD AND APPARATUS FOR MOTION BLUR AND GHOSTING PREVENTION IN IMAGING SYSTEM

(75) Inventors: Pongsak Lasang, Singapore (SG); ChinPhek Ong, Singapore (SG); Sheng Mei Shen, Singapore (SG); Kenji Tamura, Kanagawa (JP); Yusuke Monobe, Kyoto (JP)

(73) Assignee: Panasonic Corporation, Osaka (JP)

( * ) Notice: Subject to any disclaimer, the term of this patent is extended or adjusted under 35 U.S.C. 154(b) by 349 days.

(21) Appl. No.: 12/991,208

(22) PCT Filed: Jun. 19, 2008

(86) PCT No.: PCT/JP2008/001589
§ 371 (c)(1),
(2), (4) Date: Nov. 5, 2010

(87) PCT Pub. No.: WO2009/153836
PCT Pub. Date: Dec. 23, 2009

(65) Prior Publication Data
US 2011/0058050 A1    Mar. 10, 2011

(51) Int. Cl.
*H04N 5/228* (2006.01)

(52) U.S. Cl.
USPC .................................. 348/208.6; 348/241

(58) Field of Classification Search
USPC .............. 348/207.99, 208.4, 208.6, 222.1, 348/241; 382/107, 254, 284, 294, 299
See application file for complete search history.

(56) References Cited

U.S. PATENT DOCUMENTS

| 7,142,723 B2 | 11/2006 | Kang et al. |
| 2003/0095189 A1 | 5/2003 | Liu et al. |

(Continued)

FOREIGN PATENT DOCUMENTS

| EP | 1507234 | 2/2005 |
| WO | WO2007/032156 | * 3/2007 |
| WO | 2007/145373 | 12/2007 |

OTHER PUBLICATIONS

Akyuz et al., "Noise reduction in high dynamic range imaging", Journal of Visual Communication and Image Representation, Apr. 2007.*

(Continued)

*Primary Examiner* — Nelson D. Hernández Hernández
*Assistant Examiner* — Dennis Hogue
(74) *Attorney, Agent, or Firm* — Greenblum & Bernstein, P.L.C.

(57) ABSTRACT

A method and apparatus for motion blur and ghosting prevention in imaging system is presented. A residue image is computed by performing spatial-temporal filter with a set of absolute image difference of image pairs from input images. A noise adaptive pixel threshold is computed for every pixel based on noise statistics of image sensor. The residue image and the noise adaptive pixel threshold are used to create a motion masking map. The motion masking map is used to represent motion and non-motion pixels in pixels merging. The pixels merging step is performed to generate an output image by considering the motion pixels where the motion pixels are performed separately. The resulting output image having no or less motion blur and ghosting artifacts can be obtained, even the input images having different degree of motion blur between each of the image, while the complexity is low. It is preferred that the current invention is applied in the Bayer raw domain. The benefit is reduced computation and memory because only 1 color component is processed for each pixel. Another benefit is higher signal fidelity because processing in the Bayer raw domain is unaffected by demosaicing artifacts, especially along edges. However, the current invention can also be applied in RGB domain.

20 Claims, 21 Drawing Sheets

(56) References Cited

U.S. PATENT DOCUMENTS

| | | |
|---|---|---|
| 2004/0145673 A1 | 7/2004 | Washisu |
| 2005/0013501 A1 | 1/2005 | Kang et al. |
| 2005/0157949 A1* | 7/2005 | Aiso et al. ............... 382/299 |
| 2007/0242900 A1* | 10/2007 | Chen et al. ............... 382/294 |
| 2008/0056613 A1* | 3/2008 | Hatanaka et al. ......... 382/284 |
| 2008/0088711 A1* | 4/2008 | Border et al. ............ 348/222.1 |
| 2008/0187234 A1* | 8/2008 | Watanabe et al. ........ 382/254 |
| 2008/0317289 A1* | 12/2008 | Oyaizu ..................... 382/107 |

OTHER PUBLICATIONS

U.S. Appl. No. 13/004,277 to Etsuji Sato et al., which was filed on Jan. 11, 2011.
Ahmet Oguz Akyuz et al., "Noise reduction in high dynamic range imaging", Journal of Visual Communication and Image Representation, Academic Press, Inc., vol. 18, No. 5, Sep. 5, 2007, p. 366-376.
International Search Report for PCT/JP2008/001589, mailing date of Dec. 19, 2008.

* cited by examiner

METHOD AND APPARATUS FOR MOTION BLUR AND GHOSTING PREVENTION IN IMAGING SYSTEM

TECHNICAL FIELD

The present invention relates to the processing of digital image data and more particular to a method and apparatus for motion blur and ghosting prevention in imaging system.

BACKGROUND ART

An image sensor has a limitation of dynamic range and sensitivity. The image sensor sensitivity is determined by the level of light that can be detected. In dim light scene, the image that captured by the image sensor may appear dark and noise. This is known as sensitivity limitation. The image sensor dynamic range is limited by its noise floor and full-well capacity. In many cases, the dynamic range of the image sensor is lower than the dynamic range present in the scene to be captured. As a result, areas with low light intensity appear dark and noise in the captured image, while areas of high light intensity appear saturated. One technique used to overcome these problems is to capture a plurality of images at the same scene and then merge the plurality of captured images into one image. The plurality of images may be captured with same exposure and merged to reduce the noise. This is equivalent to increasing sensitivity of the image sensor. The plurality of images may also be captured with different exposures and merged to increase the dynamic range. This is known as high dynamic range (HDR) imaging.

Since this technique requires multiple input images, the motion problem may be occurred due to moving elements in the scene. It can cause blurring and ghosting artifacts in output image. This is a well known issue.

In HDR imaging, several techniques for solving motion problem in HDR image have been proposed.

Referring to FIG. 1A and FIG. 1B, an example of system and process for generating HDR image, according to U.S. Pat. No. 7,142,723 (Patent Reference 1) is described. An approach is proposed by which a system and process for generating HDR image involves first designating a reference image; each of the non-reference images is then registered with the reference image; the registration procedure generates a flow field for each of the non-reference images, involved computing a per-pixel optical flow field; the generated flow fields are then used to warp each of non-reference image; the warped images are then combined with the reference image to create a radiance map representing the HDR image. With this approach, the input non-reference images are warped, before combining/merging, to address the motion problem.

[Patent Reference 1] US patent, "System and process for generating high dynamic range images from multiple exposures of a moving scene", U.S. Pat. No. 7,142,723, 28 Nov. 2006.

Patent Prior Art

DISCLOSURE OF INVENTION

Problems to be Solved by the Invention

According to the invention described in [Patent Reference 1] above, the output image is generated by computing the optical flow fields to estimate the moving elements in the scene and to warp the non-reference images before merging. There arises therefore the problem that occluded areas and the areas having large different degree of motion blur between the images can not generate the flow fields correctly, motion blur and ghosting artifacts due to motion still left in the output image. Another problem resides in that computing the flow fields is generally high complexity.

Means for Solving the Problem

The current invention has been made inconsideration of the above-described problems and aims to efficiently prevent motion blur and ghosting artifacts in the output image due to scene motion, even the input images having different degree of motion blur between each of the images, while the complexity is low.

In order to achieve the above objective, a method and apparatus for motion blur and ghosting prevention in imaging system, comprises: step for computing a residue image from a set of an image difference where the image difference computing the absolute difference of image pair from the set of input image; step for computing a set of noise adaptive pixel threshold; step for creating a motion masking map using said residue image and said set of noise adaptive pixel threshold; and step for merging the pixels to generate the output image.

Advantageous Effect of the Invention

The current invention generates the output image via merging the plurality of input images with take in consideration of the motion pixels of the plurality of input images.

What is novel about the current invention is that the motion masking map is created from the residue image and the set of noise adaptive pixel threshold. The residue image is computed by applying spatial-temporal filter with the set of image difference. The benefit of using the spatial-temporal filter is that the residue image is robust to noise. The noise adaptive pixel threshold is adaptively computed in pixel level based on sensor noise statistics. One advantage of the noise adaptive pixel threshold is achieving better differentiation between static areas and motion areas independent of image contents. Another advantage is that the current invention works well for wide range of illumination.

The motion masking map is used to represent the motion and non-motion pixels of the plurality of input images. It is used in merging the pixels. Therefore, the resulting output image does not suffer from the motion (blur) pixels. The advantage of the current invention is that the output image has no or less motion blur and ghosting artifacts. The complexity of the current invention is low and it is robust to noise as well. The current invention also works well in case of the plurality of images having different degree of blurring in each of the image.

Additionally, it is preferred that the current invention is applied in the Bayer raw domain. Tone mapping is also preferably performed in the Bayer raw domain, after white balance is applied and before demosaicing is applied. The benefit is to reduce computation and memory because only 1 color component is processed for each pixel. Another benefit is higher signal fidelity because processing in the Bayer raw domain is unaffected by demosaicing artifacts, especially along the edges.

BEST MODE FOR CARRYING OUT THE INVENTION

Preferred embodiment of the current invention will be described in details with reference to the accompanying drawings.

(Embodiment 1)

Figure 1A:
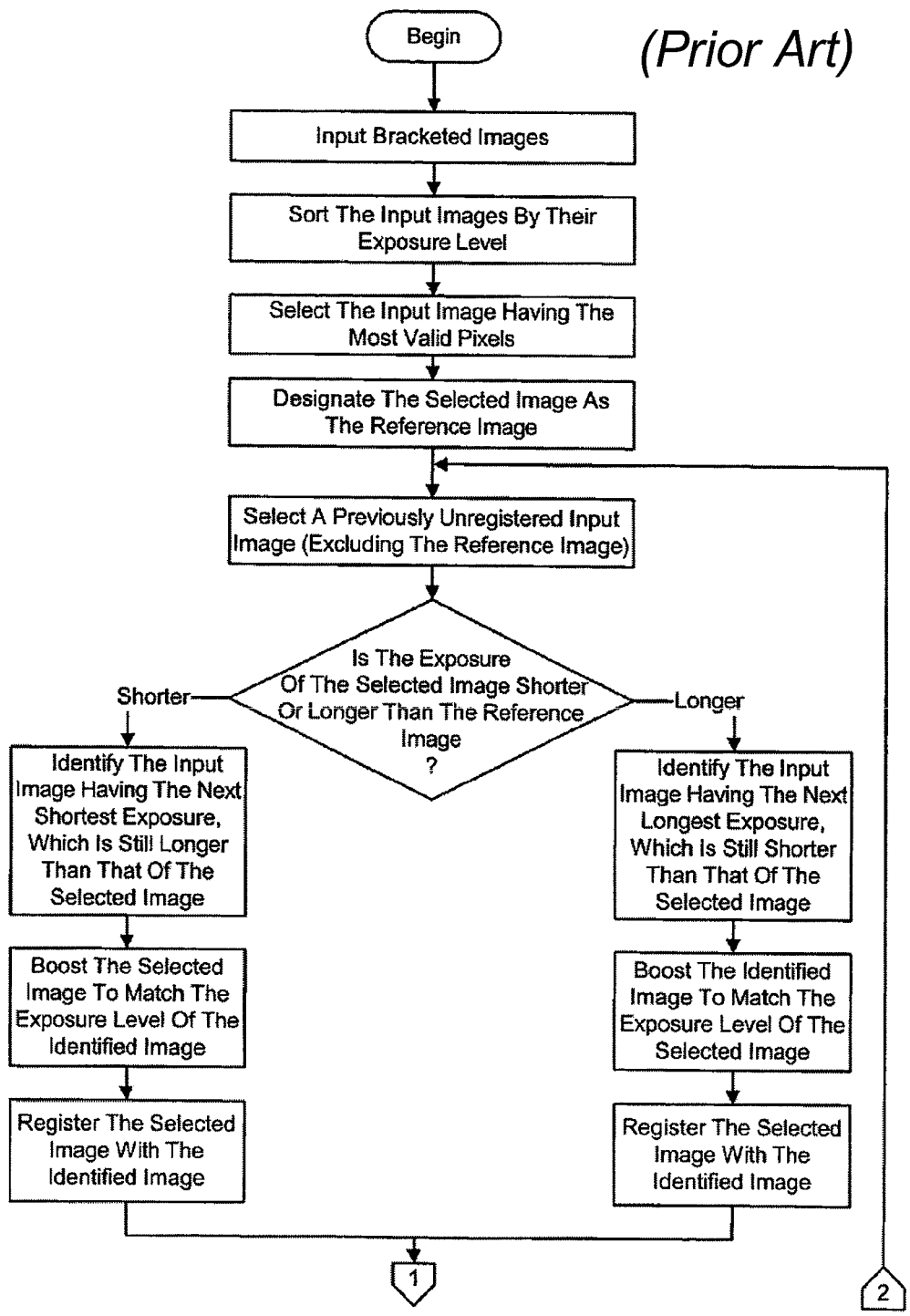
FIG. 1A is a flow diagram illustrating the overall process for generating HDR images in the prior art.
Figure 1B:
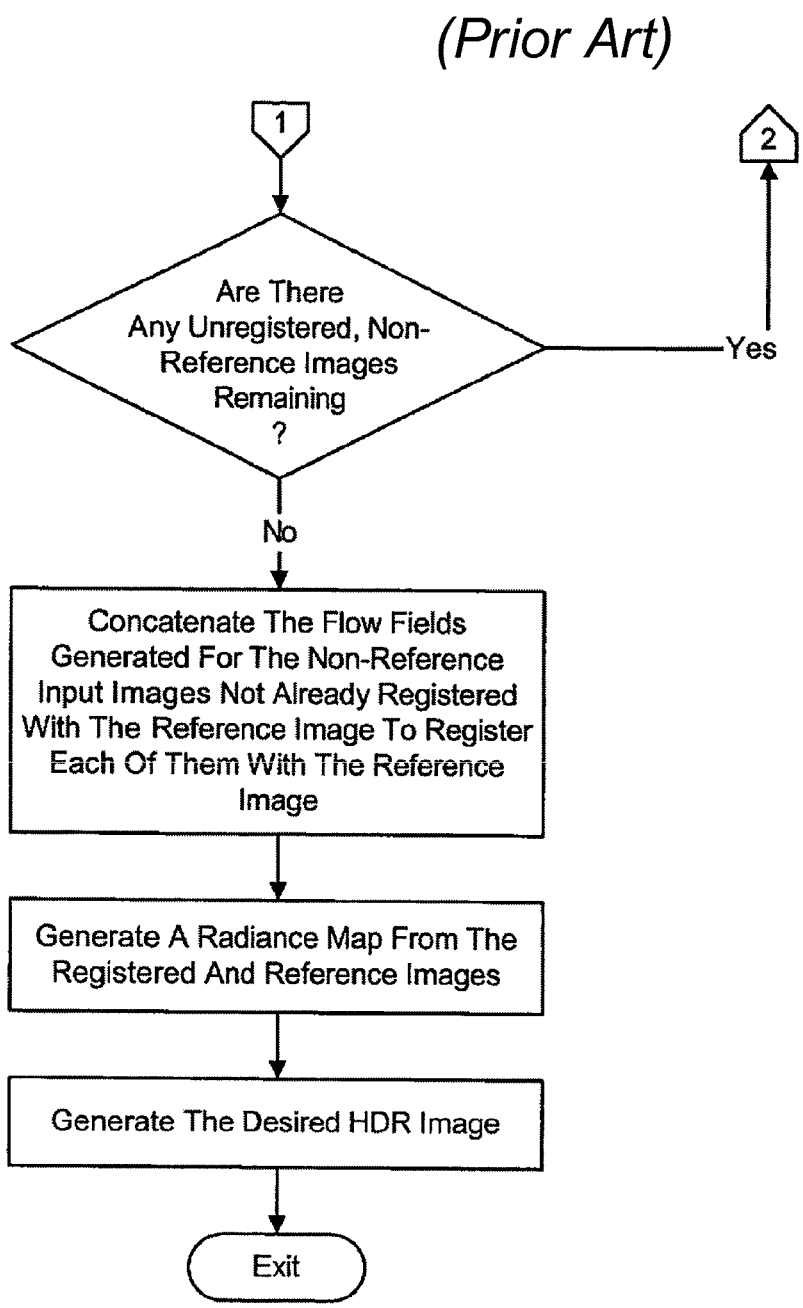
FIG. 1B is a flow diagram illustrating the overall process for generating HDR images in the prior art.
Figure 2A:
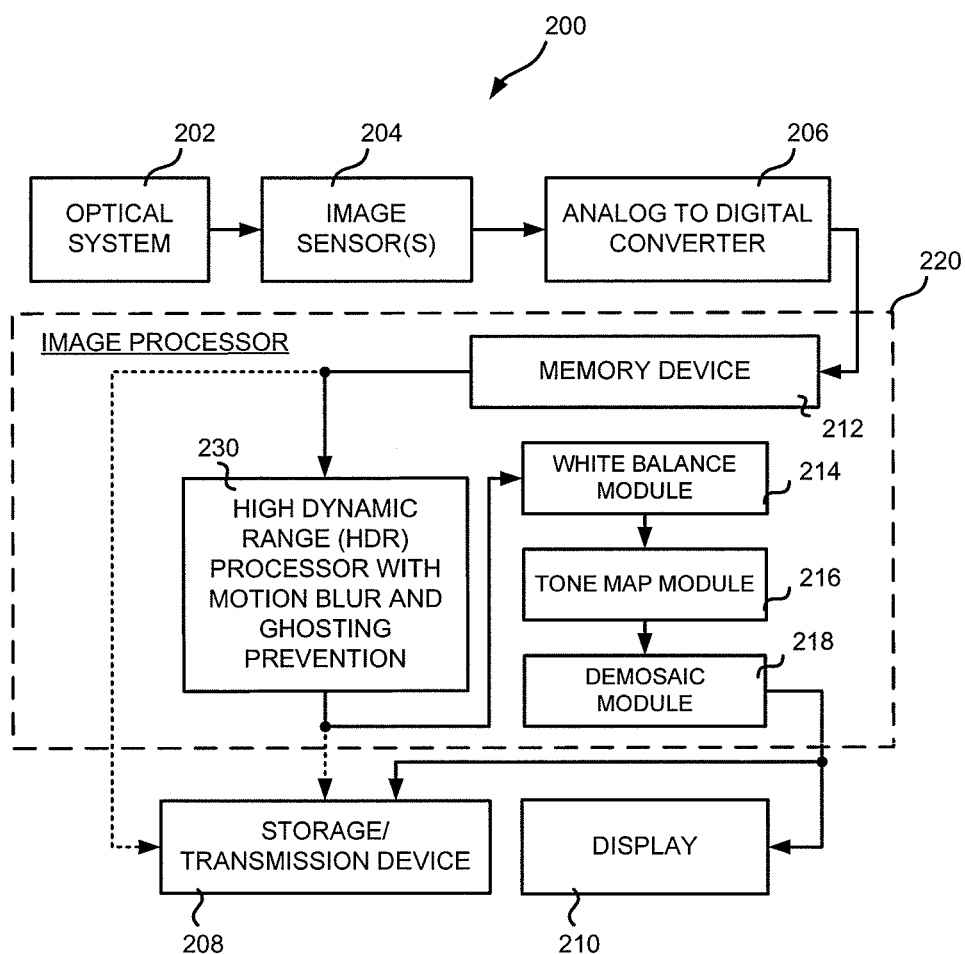
FIG. 2A is the diagrams depicting the imaging apparatus.

Referring to FIG. 2A, a block diagram of an imaging apparatus (200) according to the first embodiment of the current invention is shown. The imaging apparatus (200) consists of optical system (202), image sensor/s (204), analog-to-digital converter (206), image processor (220), storage/transmission device (208), and display (210). The image processor (220) consists of memory device (212), HDR processor with motion blur and ghosting prevention (230), white balance module (214), tone map module (216), and demosaic module (218). Other components such as user interface, microphone, speakers, etc are not shown, but this does not limit the scope and spirit of the current invention.

The optical system (202) may be consisting of components such as lenses, shutters, aperture, zoom/focus mechanism, and prisms, etc, for controlling the light signal reaching the image sensor (204). The image sensor (204) converts the light signal into electrical signal, which is converted by the analog-to-digital converter (206) into digital data, and stored in the memory device (212). The HDR processor with motion blur and ghosting prevention (230) takes in a plurality of raw images with a plurality of exposures from the memory device (212) and generates an output image, which is a raw HDR image. The raw HDR image can be stored or transmitted by the storage/transmission device (208). The raw HDR image can also be further processed by the white balance module (214), tone map module (216), and demosaic module (218); resulting in a range-compressed image suitable for showing on low dynamic range display (210) or storage/transmission by storage/transmission device (208). Examples of storage device include but are not limited to flash-based memory card, hard drives, and optical drives. Examples of transmission device include but are not limited to HDMI interface, USB interface, wireless interface and direct-to-printer interface. The storage or transmission device may optionally consist of lossless or lossy compression. The plurality of raw images can also be stored or transmitted directly using the storage/transmission device (208). The HDR image can then be generated by a separate HDR image generation apparatus of the current invention, or by a computer executing computer-executable instructions with modules implementing the HDR image generation method of the current invention.

The image processor (220) and HDR processor with motion blur and ghosting prevention (230) and the modules within are typically achieved in the form of IC (Integrated Circuit), ASIC (Application-Specific Integrated Circuit), or LSI (Large Scale Integrated) circuit. Each of these modules can be in many single-function LSIs, or also can be in one integrated LSI. The name used here is LSI, but it may also be called IC, system LSI, super LSI, or ultra LSI in accordance with the degree of integration. Moreover, ways to achieve integration is not only LSI, but also special circuit or general purpose processor and so forth can achieve the integration. FPGA (Field Programmable Gate Array) that can be programmed after manufacturing LSI or reconfigurable processor that can re-configure the connection or configuration of LSI can be used for the same purpose. In the future, with advancement in manufacturing technology, a brand-new technology may replace LSI. The integration can be done by that technology. Application of biotechnology is one such possibility.

Figure 3A:
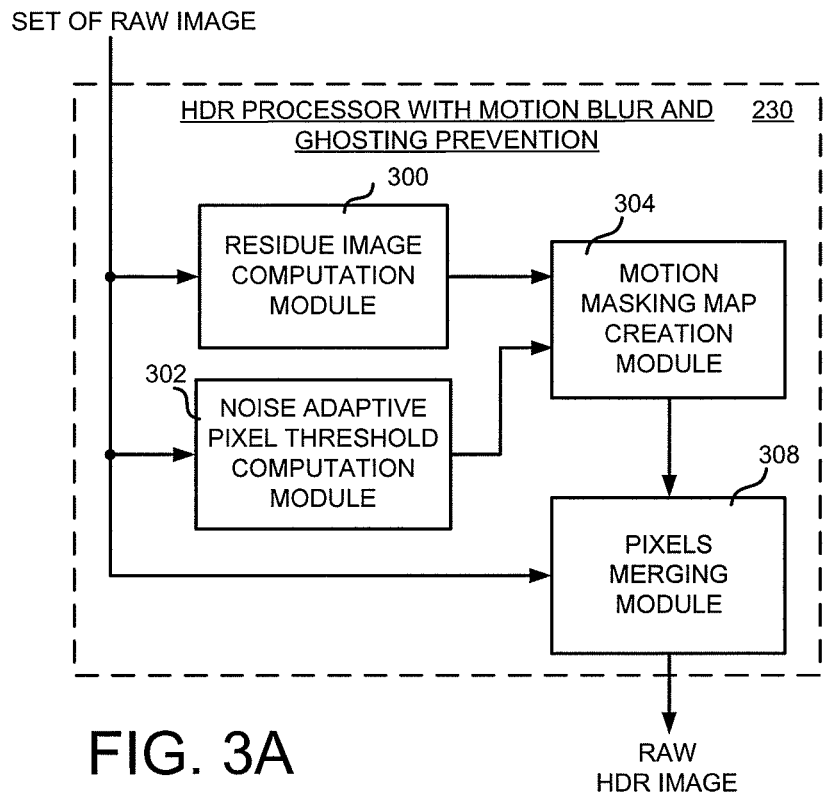
FIG. 3A and FIG. 3B are the detail block diagrams of the HDR processor with motion blur and ghosting prevention in accordance with the current invention.

Referring to FIG. 3A, the detail block diagram of the HDR processor with motion blur and ghosting prevention (230) of the imaging apparatus (200) according to the first embodiment of the current invention is shown. The HDR processor (230) with motion blur and ghosting prevention consists of a residue image computation module (300), a noise adaptive pixel threshold computation module (302), a motion masking map creation module (304), and a pixels merging module (308). The HDR processor (230) with motion blur and ghosting prevention takes in the plurality of raw images having different exposures. The residue image computation module (300) computes the residue image from a set of image difference. The noise adaptive pixel threshold computation module (302) computes a set of noise adaptive pixel threshold based on image sensor noise statistics using noise model from each of pixel intensity. The motion masking map creation module (304) creates a motion masking map using the residue image and the set of noise adaptive pixel threshold. The pixels merging module (308) merges the pixels of the plurality of raw images based on the motion masking map to generate an output image, a raw HDR image.

Figure 4:
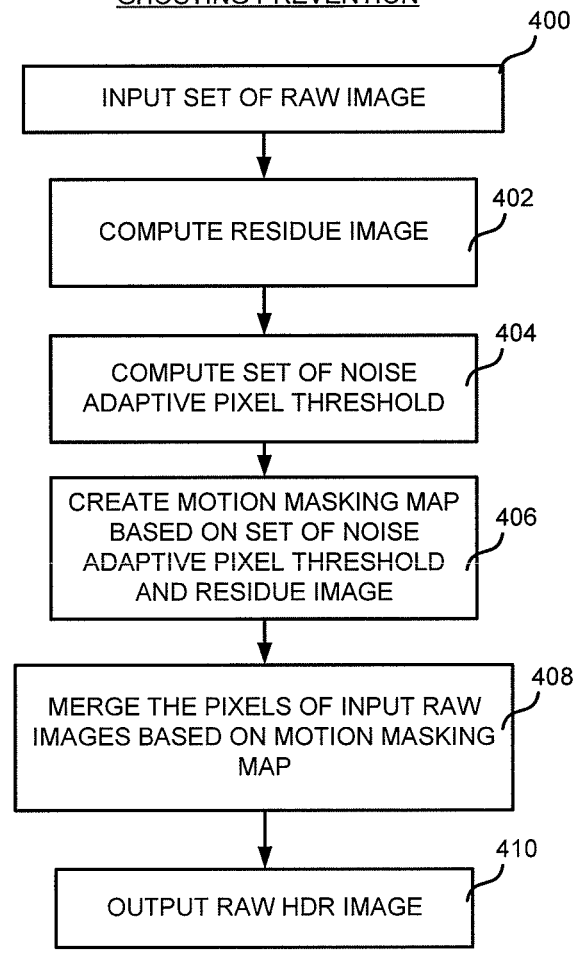
FIG. 4 is a flow diagram illustrating the operation of the HDR processor with motion blur and ghosting prevention in accordance with the current invention.

Referring to FIG. 4, a flow diagram illustrating the operation for generating an output image of the HDR processor with motion blur and ghosting prevention (230) in accordance with the current invention is shown. At step 400, the method begins by inputting an input image set containing a plurality of raw images having different exposures. Next, the method computes the residue image at step 402. The residue image is computed from a set of image difference. The set of image difference contains the difference of images computing an absolute difference of each image pair. A spatial-temporal filter is applied to the difference of images to obtain the residue image. Then, the method computes a set of noise adaptive pixel threshold based on sensor noise statistic and input images intensities at step 404. The set of noise adaptive pixel threshold is obtained based on noise variance of each of pixel intensity of the input images. After that, the method creates a motion masking map using the residue image and the set of noise adaptive pixel threshold at step 406. The motion masking map is used to represent the motion and non-motion pixels in the plurality of input images. At step 408, the method merges the pixels from the plurality of input images to generate the HDR image with considering the motion pixels of the plurality of input images based on the motion masking map and pixel saturation level. The advantage of considering the motion pixels in merging the pixels is that the final HDR image will not suffer from the artifacts (e.g. motion blur and ghosting artifacts) caused by these motion pixels. Finally, the method outputs the final raw HDR image at step 410. The final HDR image has no or less motion blur and ghosting artifacts.

Residue Image Computation Module (300)

Figure 5:
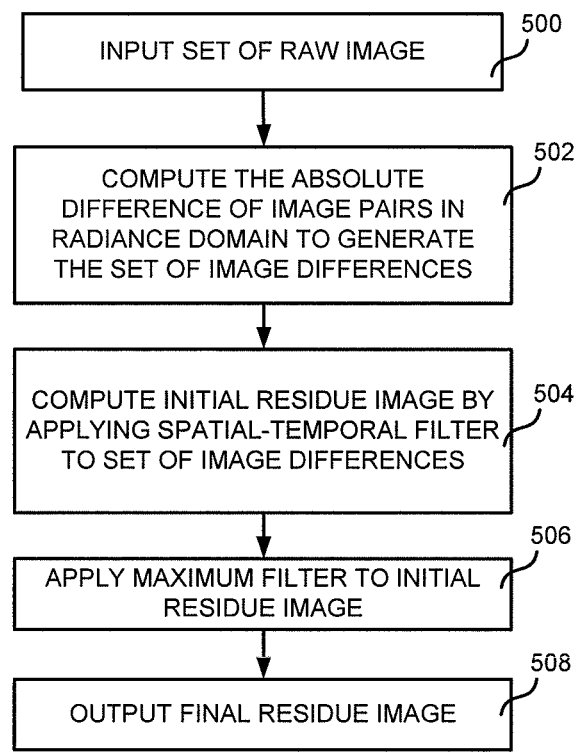
FIG. 5 is a flow diagram illustrating the operation of the residual image computation module.

FIG. 5 is a flow diagram illustrating the operation of the residue image computation module (300) of the imaging apparatus (HDR processor with motion blur and ghosting prevention (230) shown in FIG. 3A) and method shown in FIG. 4. The residue image plays a crucial role for creating the motion masking map which is used in merging the pixels for generating the output image that has no or less motion blur and ghosting artifacts. The residue image is used to identify the motion and non-motion pixels among images of the plurality of input images with the noise adaptive pixel threshold. The plurality of input images may be captured at different time sequentially. With scene motion, same object in the scene may appear in different position among the images. This causes blurring and ghosting artifacts in the output image. Moreover, the plurality of input images is captured with different exposures. This makes the motion objects to have different degree of blurring around the edges. For example, shorter exposure (shutter speed) has less blurring and longer exposure (shutter speed) has more blurring artifacts of the motion objects. This is difficult to accurately identify (or detect) motion pixels using conventional method such as using mean and variance of image or using only the difference between images.

Specifically, referring to FIG. 5, the residue image computation method begins by inputting a set of images containing the plurality of raw images, step 500. Then, an absolute difference of image pair is computed at step 502 to generate a set of image difference. In the context of the current invention, the absolute difference of image is computed in radiance domain. First, the input images are paired. The number of image pairs can be computed as $\Sigma_{p=1}^{n}(n-p)$, where n is the number of image in the plurality of input images. The absolute difference of each image pair is then computed. For example, if the input images contain 3 images, frame 0, frame 1, and frame 2. There are 3 image pairs, (0, 1), (1, 2), and (0, 2), respectively. Let $I_0$, $I_1$, $I_2$ be the input images and e0, e1, e2 be the relative exposures corresponding to input images frame 0, frame 1, frame 2, respectively. The absolute difference for each pixel location (i, j) and for each image pair can be computed as follows $$D_0(i, j) = \begin{cases} \left| \frac{I_0(i,j)}{e_0} - \frac{I_1(i,j)}{e_1} \right| & \text{if } I_0(i,j) \text{ and } I_1(i,j) < \text{saturation level} \\ 0 & \text{Otherwise,} \end{cases} \quad (1)$$

$$D_1(i, j) = \begin{cases} \left| \frac{I_1(i,j)}{e_1} - \frac{I_2(i,j)}{e_2} \right| & \text{if } I_1(i,j) \text{ and } I_2(i,j) < \text{saturation level} \\ 0 & \text{Otherwise,} \end{cases}$$

$$D_2(i, j) = \begin{cases} \left| \frac{I_0(i,j)}{e_0} - \frac{I_2(i,j)}{e_2} \right| & \text{if } I_0(i,j) \text{ and } I_2(i,j) < \text{saturation level} \\ 0 & \text{Otherwise,} \end{cases}$$

where D0, D1, and D2 are image differences of image pairs (0,1), (1,2), and (0,2), respectively, called "set of image difference". The || is an absolute operator.

Ideally, the difference between the images capturing of the same scene should be zero. In practical, the difference of images is possibly non-zero because of several factors such as noise from image sensor, illumination change among captured images, scene motion, and etc. If there is no noise and illumination change, non-zero pixels in image differences are caused by motion objects in the scene. In this case, motion pixels can be easily identified or detected using only image differencing method. Unfortunately, the captured images may contain noise or illumination change or both. Non-zero pixels in image differences may not be exactly motion pixels.

In the current invention method, at step 504, an initial residue image is generated using spatial-temporal filter applied to set of image difference. Spatial filter is applied to each of image difference. Then, temporal filter is applied. Spatial filter can be any kinds of spatial filter kernels, for example Gaussian filters, Hanning filter, etc, and can be circular or rectangular filter. An example for generating the initial residue image from 3 image differences using spatial-temporal average filter is given below. Let Res (i,j) be the initial residue image at each pixel location (i,j). The Res(i,j) can be computed, for example, as $$Res(i, j) = \frac{1}{3} \sum_{m=-1}^{1} \sum_{n=-1}^{1} D_0(i+m, j+n) + \frac{1}{3} \sum_{m=-1}^{1} \sum_{n=-1}^{1} D_1(i+m, j+n) + \frac{1}{3} \sum_{m=-1}^{1} \sum_{n=-1}^{1} D_2(i+m, j+n) \quad (2)$$

Equations (1) and (2) can be modified and extended for more number of images in input image set. It is not limited only for 3 images in input image set. Spatial filter makes the method robust to spatial noise from image sensor. Temporal filter makes the method robust to temporal and inconsistency noises. In addition, the current method is also robust, even if the images having different degree of blurring. More advanced complex technique may be used to perform spatial-temporal filter. It is still in the same scope of this invention.

In case of the plurality of input images contain 2 images. The absolute difference can be computed from one image pair. The spatial filter can be applied to generate the initial residue image. The temporal filter can be omitted.

At step 506, the maximum filter is applied to the initial residue image. Then the final residue image is obtained. The purpose of this step is to prevent noise and un-connectivity around the edges of the motion areas. This increases robustness of the current method. Maximum filter can be any shapes and any sizes. For example, if the maximum filter is rectangular window size of 7×7 pixels, the output of the pixel located in the window is the maximum of pixel value in the window. The window will slide to the next pixel one by one pixel for all the pixels in the initial residue image. Finally, step 508 outputs the final residual image. This final residue image is then used to identify motion pixels with the set of noise adaptive pixel threshold in motion masking map creation.

Noise Adaptive Pixel Threshold Computation Module (302)

Figure 6:
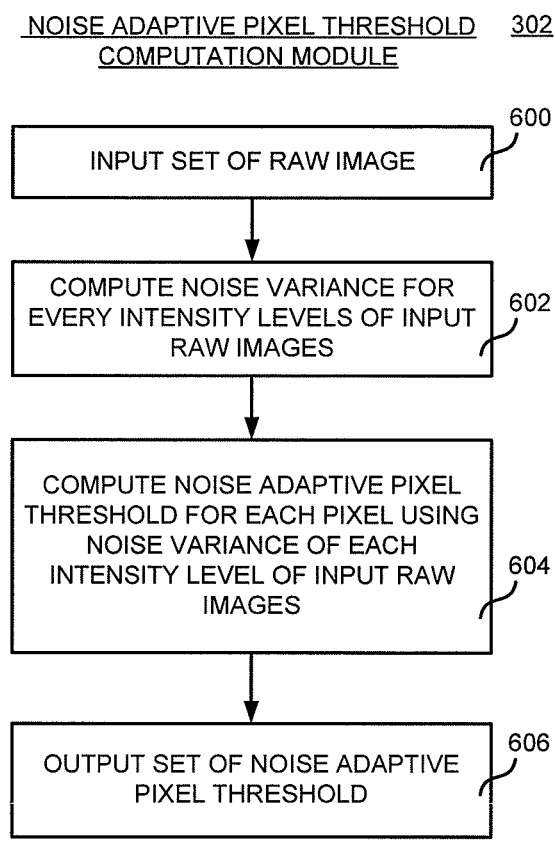
FIG. 6 is a flow diagram illustrating the operation of the noise adaptive pixel computation module.

FIG. 6 is a flow diagram illustrating the operation of a noise adaptive pixel threshold computation module (302) of the imaging apparatus (HDR processor with motion blur and ghosting prevention (230) shown in FIG. 3A) and method shown in FIG. 4. The method begins by inputting a set of images containing the plurality of raw images at step 600. The noise variance of the input raw images is computed for each of intensity level at step 602. The noise variance can be computed in various ways. It is preferably to compute the noise variance based on sensor noise statistics using noise model. Therefore, the noise variance of input raw images is independent on image contents. The sensor noise statistics may be modeled as $$\sigma_s^2 = \alpha I + \beta \quad (3)$$

where $\alpha$ and $\beta$ are the parameters representing photon noise and dark noise, respectively, and can be obtained from sensor calibration. I is the pixel intensity. Once the noise variance of input raw images for each of intensity level is known, a noise adaptive pixel threshold can be computed at step 604. It is computed for every pixel positions. An example of computing the noise adaptive pixel threshold (NAThr) at pixel position (i,j) for the plurality of input images containing n+1 images is given below $$NAThr(i, j) = k \left[ \begin{array}{c} w_0 \dfrac{\sigma_0^{(i,j)}}{e_0} + w_1 \dfrac{\sigma_1^{(i,j)}}{e_1} + \\ w_2 \dfrac{\sigma_2^{(i,j)}}{e_2} + \ldots + w_n \dfrac{\sigma_n^{(i,j)}}{e_n} \end{array} \right], \quad (4)$$

where $\sigma_n^{(i,j)}$ is the noise standard deviation of the pixel located at position (i,j) of input image frame n th. $e_n$ is the relative exposure of the image frame n th. $w_n$ is the weight used to control the contribution of noise of image frame n th and $w_n$ can be varied from 0 to 1. k is the parameter used to control the threshold level which is based on the cumulative area of noise distribution. For example, k can be set to 1.0 for 68% cumulative area and can be set to 2.0 for 95% cumulative area of normal distribution.

Once the noise adaptive pixel threshold for each pixel is computed, the method outputs the set of noise adaptive pixel threshold at step 606. The set of noise adaptive pixel threshold is used in the motion masking map creation. The advantage of computing noise adaptive pixel threshold in pixel level is robust to noise and achieving better differentiation between static areas and motion areas. It is independent of image contents.

Motion Masking Map Creation Module (304)

Figure 7:
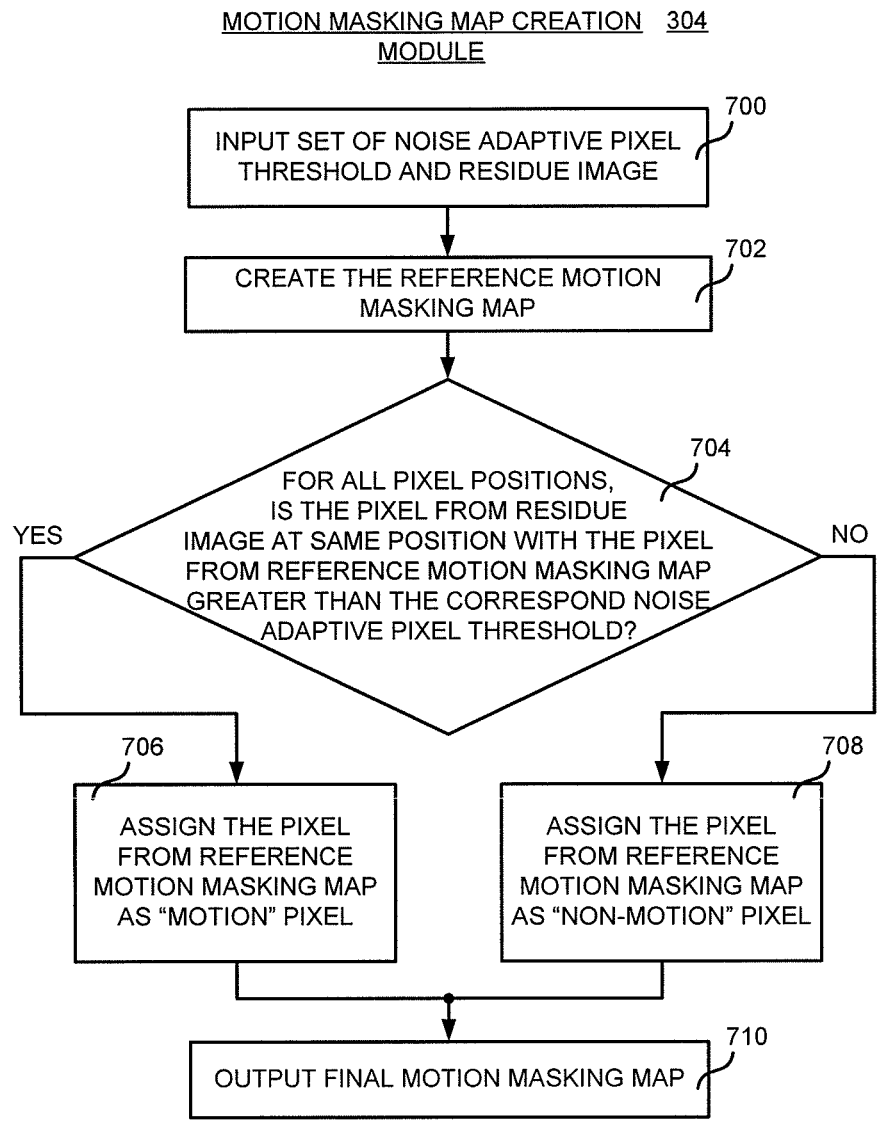
FIG. 7 is a flow diagram illustrating the operation of the motion masking map creation module.

FIG. 7 is a flow diagram illustrating the operation of a motion masking map creation module (304) of the imaging apparatus (HDR processor with motion blur and ghosting prevention (230) shown in FIG. 3A) and method shown in FIG. 4. The method begins by inputting the set of noise adaptive pixel threshold and the residue image step 700. Then, the method creates a reference motion masking map at step 702. The residue image and the set of adaptive pixel threshold are compared for every pixel positions at step 704. At each pixel position, if the pixel value from the residue image is greater than the noise adaptive pixel threshold at the same position, the method assigns the pixel from the reference motion masking map at the same position as "MOTION" pixel at step 706. If the pixel value from the residue image is greater than the noise adaptive pixel threshold at the same position, the method assigns the pixel from the reference motion masking map at the same position as "NON-MOTION" pixel at step 708. After all pixel positions from the residue image are compared and all pixel positions from the reference motion masking map are assigned, the method outputs the final motion masking map at step 710.

The motion masking map is used in pixels merging. It represents motion and non-motion pixels among the input images. The accurate motion masking map results the output image from pixels merging with no or less motion blur and ghosting artifacts.

Pixels Merging Module (308)

Figure 8A:
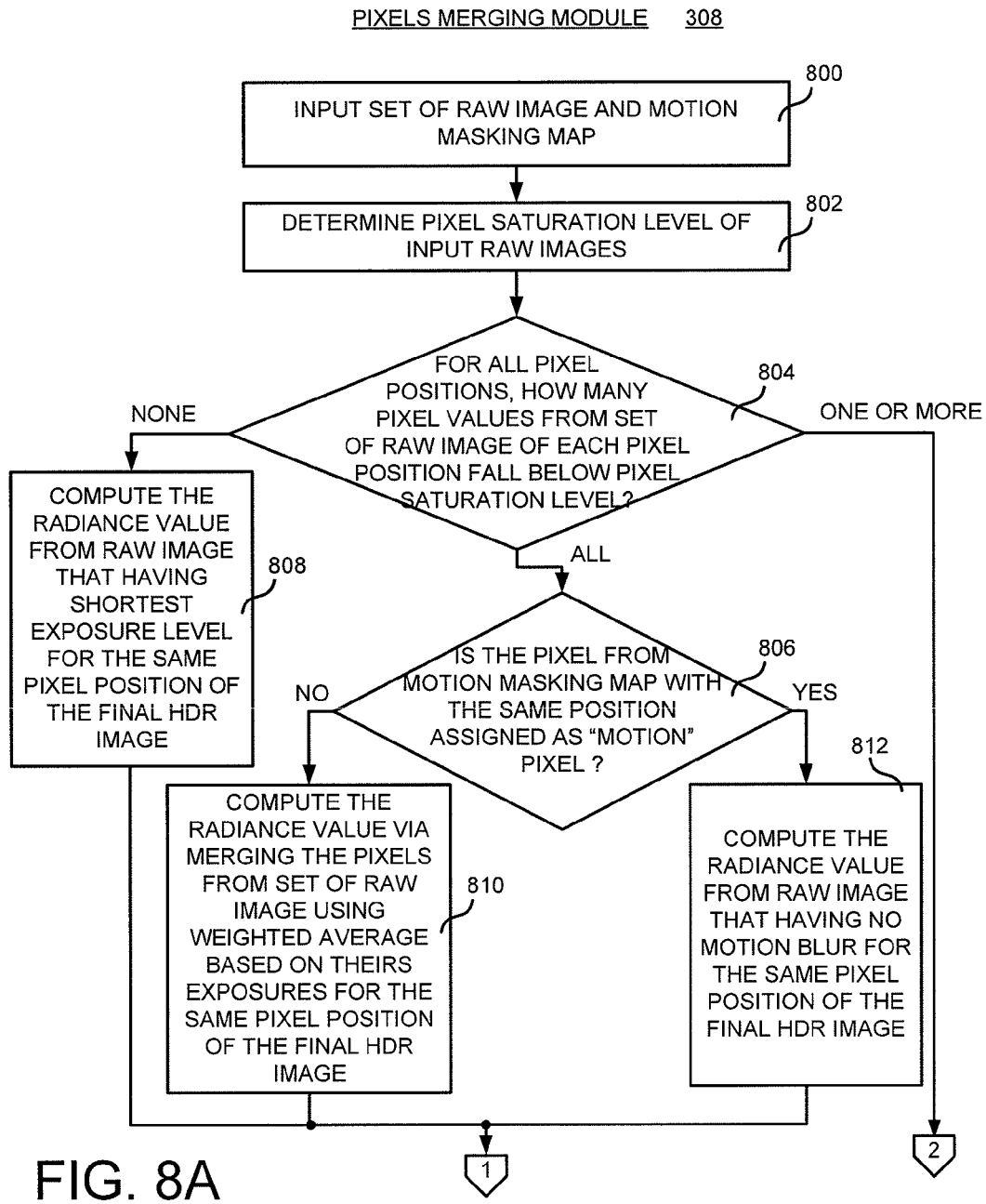
FIG. 8A is a flow diagram illustrating the operation of the pixels merging module.
Figure 8B:
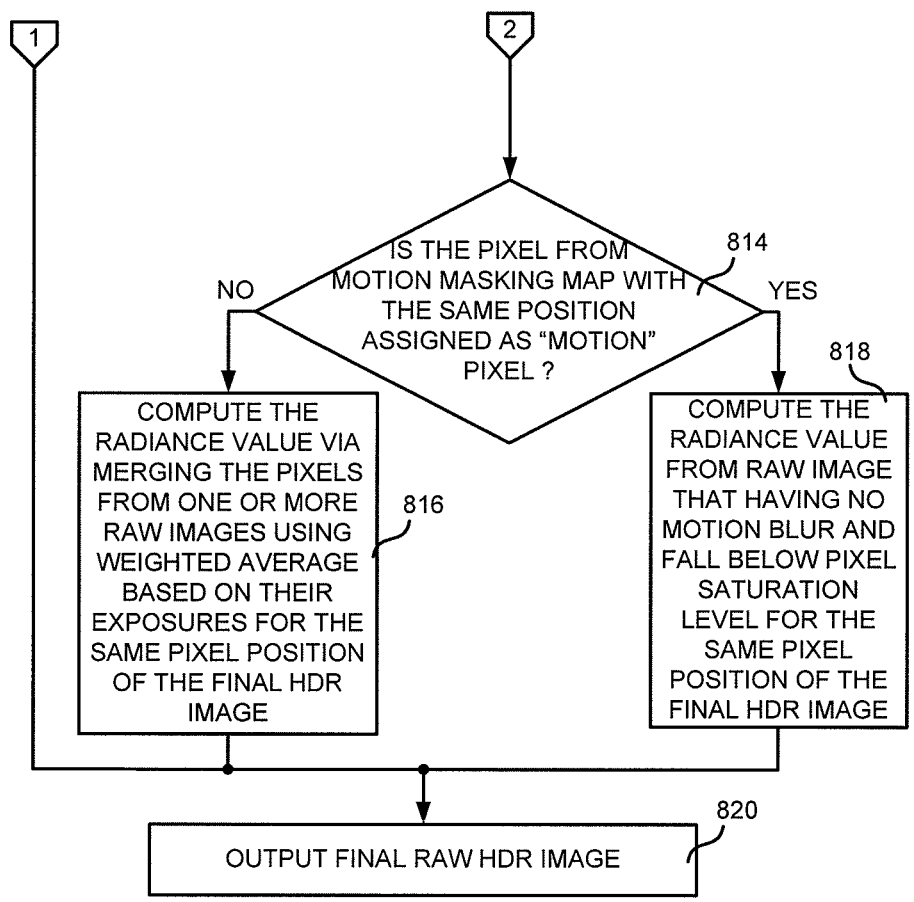
FIG. 8B is a flow diagram illustrating the operation of the pixels merging module.

FIG. 8 is a flow diagram illustrating the operation of pixels merging module (308) of the imaging apparatus (HDR processor with motion blur and ghosting prevention (230) shown in FIG. 3A) and method shown in FIG. 4. The plurality of input raw images are merged together to obtain an output HDR image. In case of motion occur, the motion pixels are performed separately. The motion pixels are represented by the motion masking map. Therefore, the resulting output HDR image with no or less motion blur and ghosting artifacts can be obtained.

The plurality of input raw image may be filtered by low pass filter to reduce the image noise. It may be filtered for all images or may be filtered for some images. Short exposure image is possibly higher image noise. Long exposure image is possibly lower image noise. The low pass filter may be applied for each image with different parameters.

Referring to FIG. 8, at step 800, the method inputs the plurality of raw images having different exposures and the motion masking map created from the motion masking map creation module (304). At step 802, a pixel saturation level of the plurality of raw images is determined. It may be the maximum pixel value of an image, for example 255 for 8 bits image, 1023 for 10 bits image, or 4095 for 12 bits image. It also can be computed in term of percentile of the maximum pixel value. At step 804, for each of pixel position, all pixel values from input images at the same pixel position are compared to the pixel saturation level. If all pixel values from input images at the same pixel position fall below the pixel saturation level, the pixel from the motion masking map at the same position is checked whether this position has been assigned as "MOTION" pixel at step 806. If none of pixels values from input images at the same pixel position fall below the pixel saturation level, the radiance value of the pixel from the output HDR image at the same position is computed from the input image that has shortest exposure at step 808. If one or more pixel values from input images at the same pixel position fall below the pixel saturation level, the pixel from the motion masking map at the same position is checked whether this position has been assigned as "MOTION" pixel at step 814.

At step 806, if the pixel from the motion masking map at the same position is assigned as "MOTION" pixel, then the radiance value of the pixel from the output HDR image at the same position can be computed from the best input image based on its exposure at step 812. The best image is defined as the input image that has no motion blur and falling below the pixel saturation level. For example, if I1 is the best input image, the radiance value of the pixel in the output HDR image at position (i,j) can be computed as follows $$\text{Radiance}(i, j) = \frac{I_1(i, j)}{e_1}, \quad (5)$$

where $e_i$ is the relative exposure of the input image $I_i$. If the pixel from the motion masking map at the same position is not assigned as "MOTION" pixel, then the radiance value of the pixel from the output HDR image at the same position can be computed via merging all pixels from the input images using weighted average at step 810 as follows $$\text{Radiance}(i, j) = g_0 \frac{I_0(i, j)}{e_0} + g_1 \frac{I_1(i, j)}{e_1} + g_2 \frac{I_2(i, j)}{e_2} + \ldots + g_n \frac{I_n(i, j)}{e_n}, \quad (6)$$

where $g_n$ is the weight for the image $I_n$. The weights can be computed in various ways. An example of computing the weight based on the relative exposure is given bellows.

$$g_n = \frac{e_n}{e_0 + e_1 + e_2 + \ldots + e_n} \quad (7)$$

However, the other techniques can be used for computing the weights. It is still in the same scope of this invention.

At step 814, if the pixel from the motion masking map at the same position is assigned as "MOTION" pixel, then the radiance value of the pixel from the output HDR image at the same position can be computed from the best input image based on its exposure at step 818 as in equation (5) for example. If the pixel from the motion masking map at the same position is not assigned as "MOTION" pixel, then the radiance value of the pixel from the output HDR image at the same position can be computed via merging one or more pixels from the input images using weighted average at step 816 as in equation (6) for example. When the radiance value of the output HDR image is computed for every pixel position, the output HDR image is output at step 820. The output HDR is in Bayer raw format.

The method and apparatus described above is performed in Bayer raw domain. Only one color component per pixel is processed. Therefore, it is low complexity and low memory requirement comparing with processing in RGB (Red, Green, and Blue which have gone through demosaic) domain which requires 3 color components per pixel for processing. In addition, processing in Bayer raw domain has higher signal fidelity because it is not affected by the demosaicing algorithm.

Figure 2B:
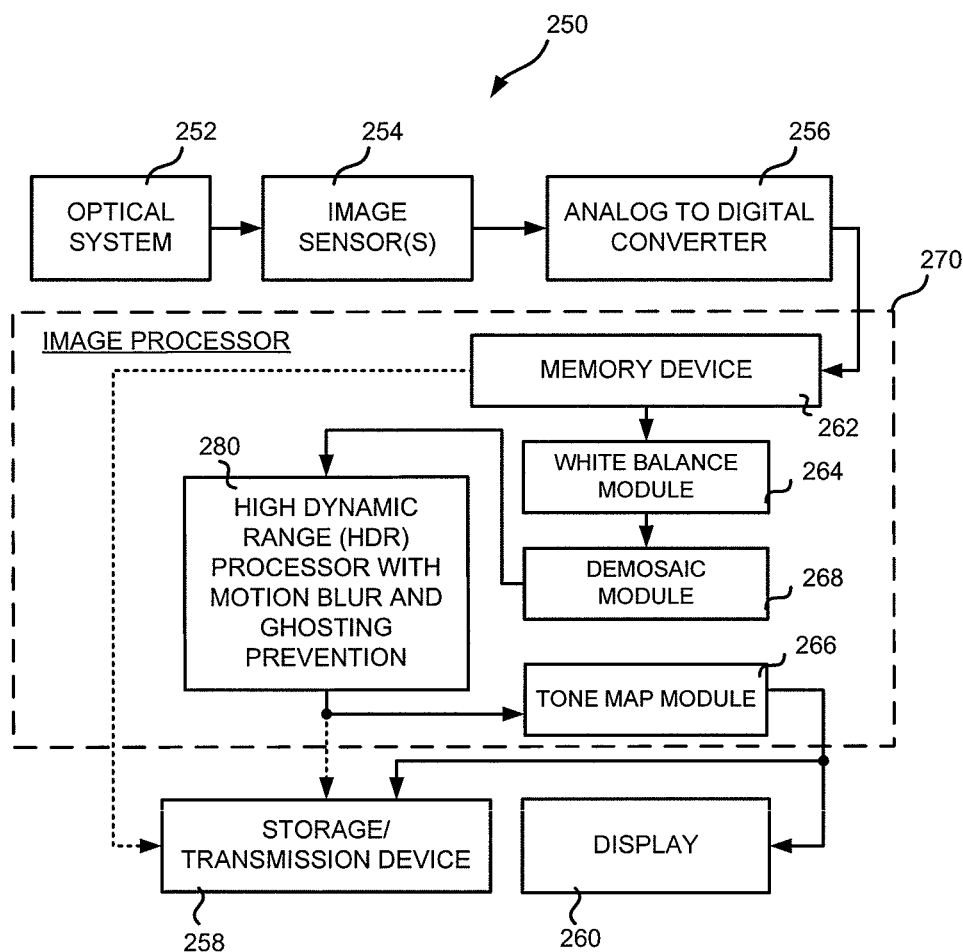
FIG. 2B is the diagrams depicting the imaging apparatus.

However, the method and apparatus described above can also be applied in RGB domain. Referring to FIG. 2B, a block diagram of an imaging apparatus (250) according to the first embodiment of the current invention is shown. The imaging apparatus (250) consists of optical system (252), image sensor/s (254), analog-to-digital converter (256), image processor (270), storage/transmission device (258), and display (260). The image processor (270) consists of memory device (262), HDR processor with motion blur and ghosting prevention (280), white balance module (264), tone map module (266), and demosaic module (268). The optical system (252) may be consisting of components such as lenses, shutters, aperture, zoom/focus mechanism, and prisms, etc, for controlling the light signal reaching the image sensor (254). The image sensor (254) converts the light signal into electrical signal, which is converted by the analog-to-digital converter (256) into digital data, and stored in the memory device (262). The raw images from the memory device (262) are processed by the white balance module (264) and demosaic module (268), resulting the RGB images which have 3 color components (red, green, blue) per pixel. The RGB images are passed to the HDR processor with motion blur and ghosting prevent ion (280) to generate an output HDR image. The R, G, and B color components can be process separately. The output HDR image can be stored or transmitted by the storage/transmission device (258). It can also be processed by the tone map module (266), resulting in range-compressed image suitable for showing on the display (260) or storage/transmission by storage/transmission device (258).

Figure 3B:
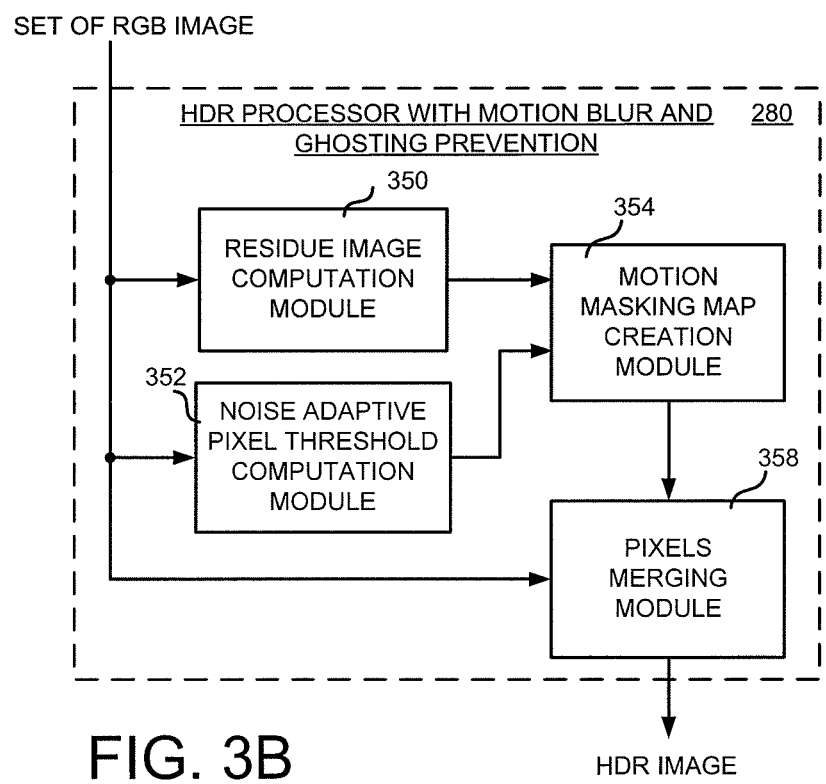

Referring to FIG. 3B, the detail block diagram of the HDR processor with motion blur and ghosting prevention (280) of the imaging apparatus (250) according to the first embodiment of the current invention is shown. The HDR processor with motion blur and ghosting prevention (280) consists of a residue image computation module (350), a noise adaptive pixel threshold computation module (352), a motion masking map creation module (354), and a pixels merging module (358). The HDR processor with motion blur and ghosting prevention (280) takes in the plurality of RGB images having different exposures. The residue image computation module (350) computes the residue image from a set of image difference. Since the RGB image contains 3 color components per pixel, the set of image difference can be computed for each of color component separately using the method and apparatus described above. To reduce complexity, it is preferably computed the set of image difference for G (green) color component only. The residue image can be computed from the set of image difference of G color component using the method and apparatus for computing residue image described above. The noise adaptive pixel threshold computation module (352) computes a set of noise adaptive pixel threshold based on image sensor noise statistics using noise model from each of pixel intensity. The intensity of only G color component will be used. The motion masking map creation module (354) creates a motion masking map using the residue image and the set of noise adaptive pixel threshold using the method and apparatus described above. The pixels merging module (358) merges the pixels of the plurality of RGB images based on the motion masking map to generate an output HDR image. The R, G, and B are performed separately. The method and apparatus for pixels merging described above can be used.

Having described in great detail of method and apparatus in imaging system above, the examples of the means to capture the plurality of images with the plurality of exposures will be discussed.

Figure 9:
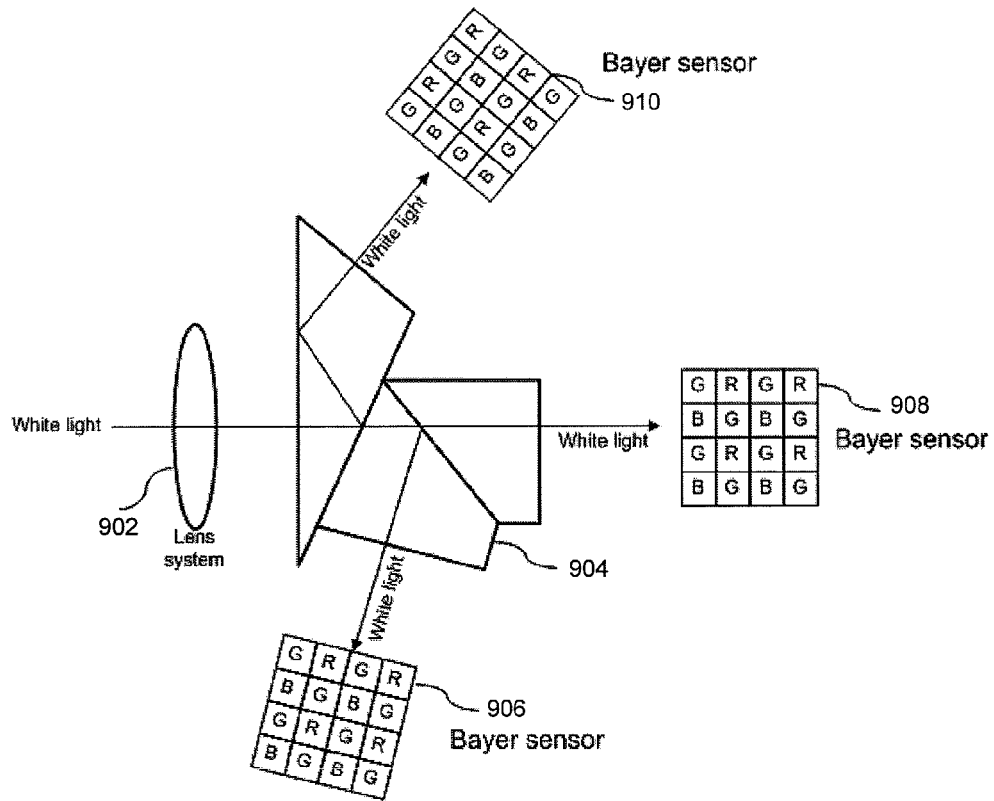
FIG. 9 is an example of an apparatus to capture a plurality of image with a plurality of exposures.

The plurality of input images with a plurality of exposures can be achieved by various means. Referring to FIG. 9, one example is shown. It consists of a lens system (902), prisms (904), and 3 Bayer sensors (906, 908, and 910). White light enters the lens system (902) is split into 3 channels by the prisms (904). Each channel is then captured by the corresponding Bayer sensor (906, 908, and 910). The plurality of exposures can be achieved by changing the splitting characteristics of the prisms, such that the light intensity is different for each channel. Alternatively it can be achieved by changing the settings of the sensor, such as shutter speed and sensitivity. A combination of prisms splitting and sensor settings can also be used. The use of a 3 channels split prisms is for example only. A 2 channels, 4 channels, 5 channels, etc, split prism and sensors can also be used.

Figure 10:
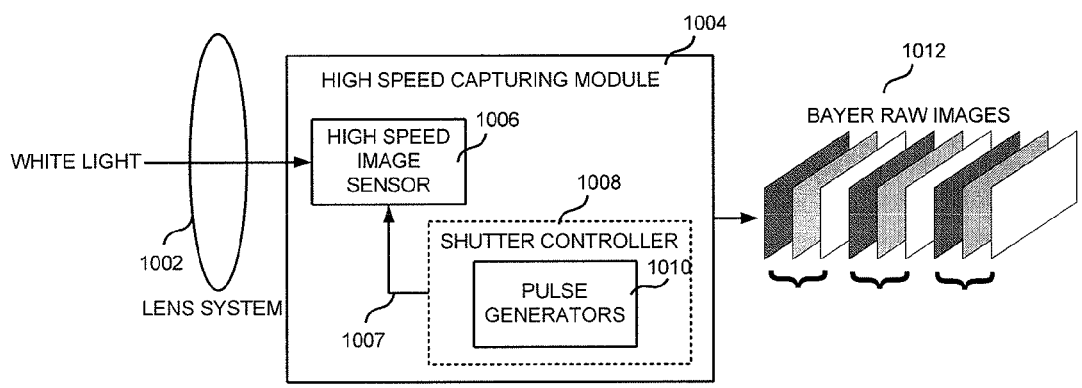
FIG. 10 is another example of an apparatus to capture a plurality of image with a plurality of exposures.
Figures 11A, 11B:
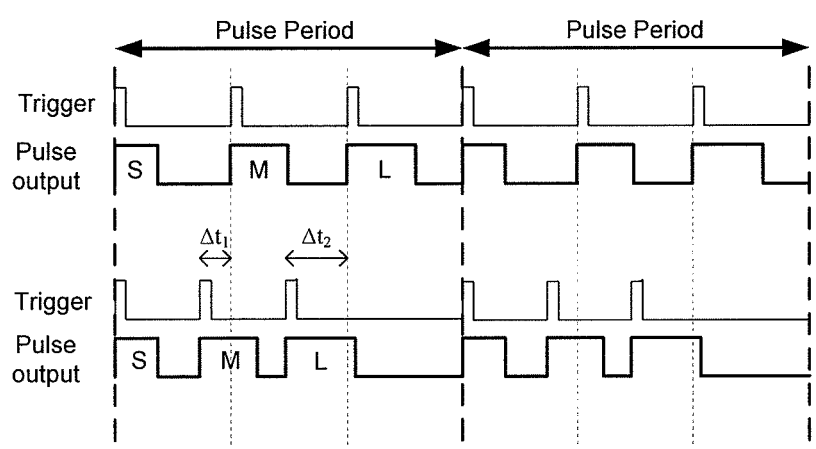
FIG. 11A and FIG. 11B are an example of pulse output signal from pulse generators.

Referring to FIG. 10, another example to capture a plurality of images with a plurality of exposures is shown. It consists of a lens system (1002) and a high speed capturing module (1004), wherein a high speed capturing module (1004) may consists of a high speed image sensor (1006), a shutter controller (1008), and other modules which are not shown here. White light entering the lens system is sequentially captured by the high speed image sensor (1006) with frame rate 180 frames per second corresponding to shutter signal (1007) from the shutter controller (1008) to obtain the plurality of Bayer raw images (1012). The plurality of exposures can be achieved by controlling the shutter signal (1007) using the pulse generators (1010). Referring to FIG. 11A and FIG. 11B, two examples of the pulse output signal from the pulse generators are shown. The duration of exposure time is controlled by the width of the pulse. Short width results in a short exposure (S), medium width results in a medium exposure (M), and long width results in a long exposure (L). In this example, the pattern or S, M, and L pulse width is repeated. Each set of a plurality of image will thus contain 3 exposures. The use of pulse generators to generate shutter signal is for example only. However, shutter signal can also generate by others means that can generate others signal, for example trigger signal. The high speed capturing module mentioned here can be any means that can capture the images with high frame rate and is not limited only frame rate 180 frames per second. It also can be lower or higher frame rate.

(Embodiment 2)

According to the first embodiment, the method and apparatus in imaging system which require the plurality of input images having different exposures have been described in great detail. In this embodiment, the method and apparatus in imaging system which require the plurality of input images having same exposure will be described.

Figure 12A:
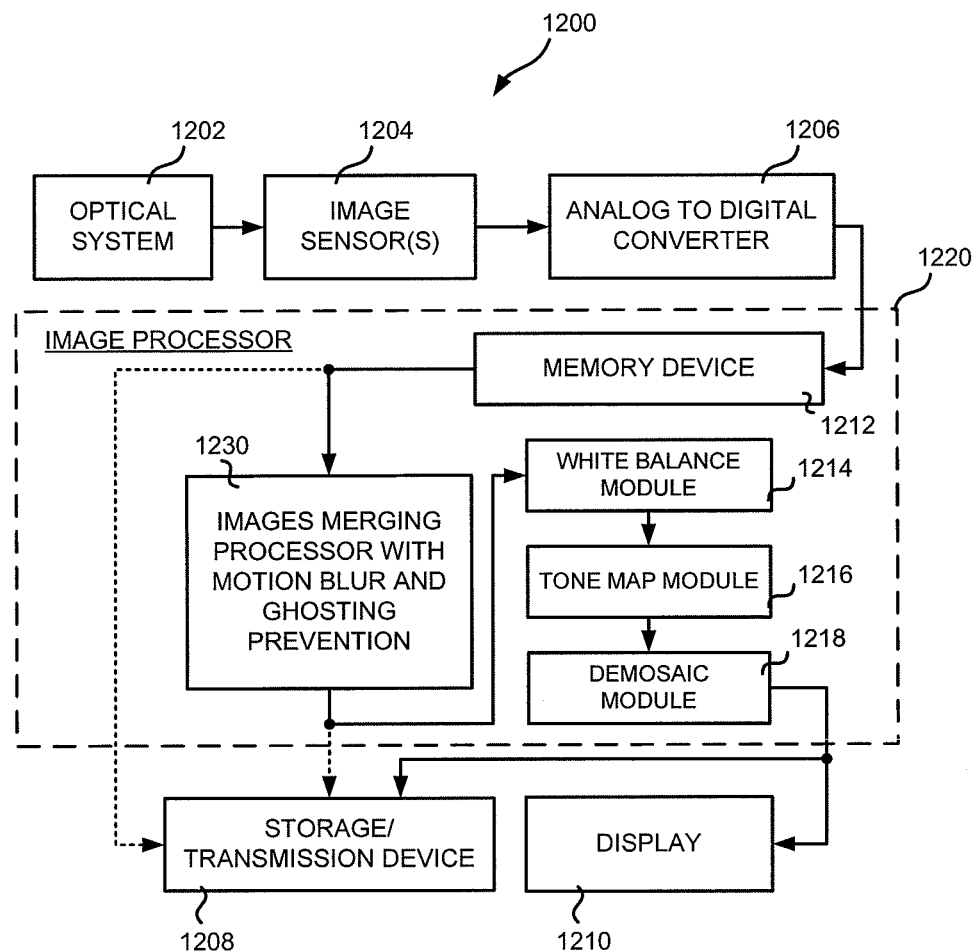
FIG. 12A is the another diagrams depicting the imaging apparatus.

Referring to FIG. 12A, a block diagram of an imaging apparatus (1200) according to the second embodiment of the current invention is shown. The imaging apparatus (1200) consists of optical system (1202), image sensor/s (1204), analog-to-digital converter (1206), image processor (1220), storage/transmission device (1208), and display (1210). The image processor (1220) consists of memory device (1212), images merging processor with motion blur and ghosting prevention (1230), white balance module (1214), tone map module (1216), and demosaic module (1218). Other components such as user interface, microphone, speakers, etc are not shown, but this does not limit the scope and spirit of the current invention. The optical system (1202) may be consisting of components such as lenses, shutters, aperture, zoom/focus mechanism, and prisms, etc, for controlling the light signal reaching the image sensor (1204). The image sensor (1204) converts the light signal into electrical signal, which is converted by the analog-to-digital converter (1206) into digital data, and stored in the memory device (212). The images merging processor with motion blur and ghosting prevention (1230) takes in a plurality of raw images with the same exposure from the memory device (1212) and generates an output image. The output image can be stored or transmitted by the storage/transmission device (1208). The output image can also be further processed by the white balance module (1214), tone map module (1216), and demosaic module (1218); resulting in a suitable range for showing on the display (1210) or storage/transmission by storage/transmission device (1208). The plurality of raw images can also be stored or transmitted directly using the storage/transmission device (1208).

Figure 13A:
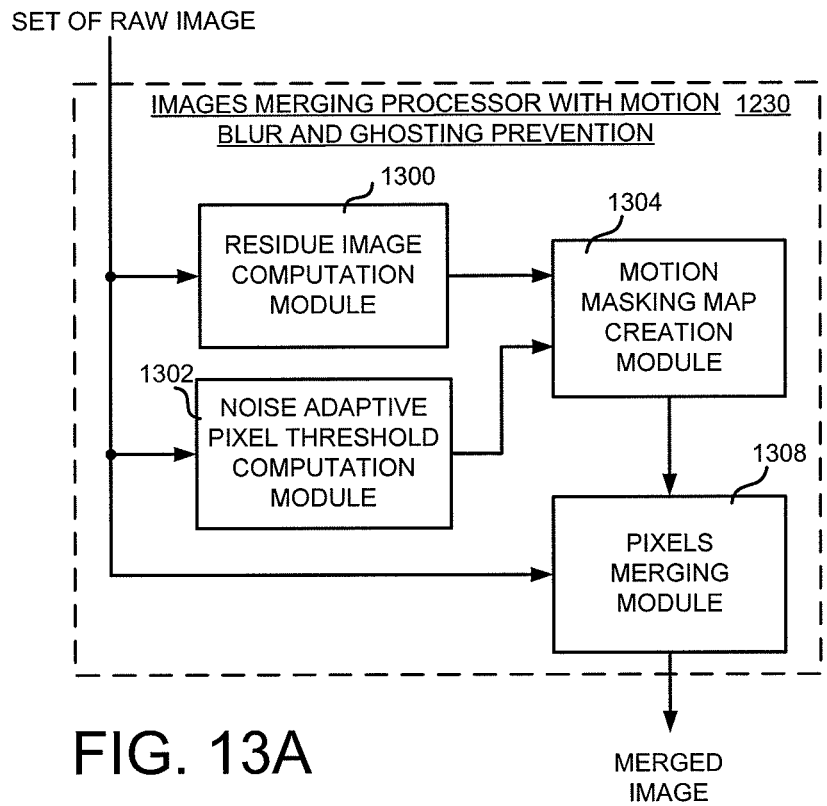
FIG. 13A and FIG. 13B are the detail block diagrams of the images merging processor with motion blur and ghosting prevention in accordance with the current invention.

Referring to FIG. 13A, the detail block diagram of the images merging processor with motion blur and ghosting prevention (1230) of the imaging apparatus (1200) according to the second embodiment of the current invention is shown. The images merging processor (1230) consists of a residue image computation module (1300), a noise adaptive pixel threshold computation module (1302), a motion masking map creation module (1304), and a pixels merging module (1308). The images merging processor with motion blur and ghosting prevention (1230) takes in the plurality of raw images having same exposure. The residue image computation module (1300) computes the residue image from a set of image difference. The noise adaptive pixel threshold computation module (1302) computes a set of noise adaptive pixel threshold based on image sensor noise statistics using noise model from each of pixel intensity. The motion masking map creation module (1304) creates a motion masking map using the residue image and the set of noise adaptive pixel threshold. The pixels merging module (1308) merges the pixels of the plurality of raw images based on the motion masking map to generate an output image.

Figure 14:
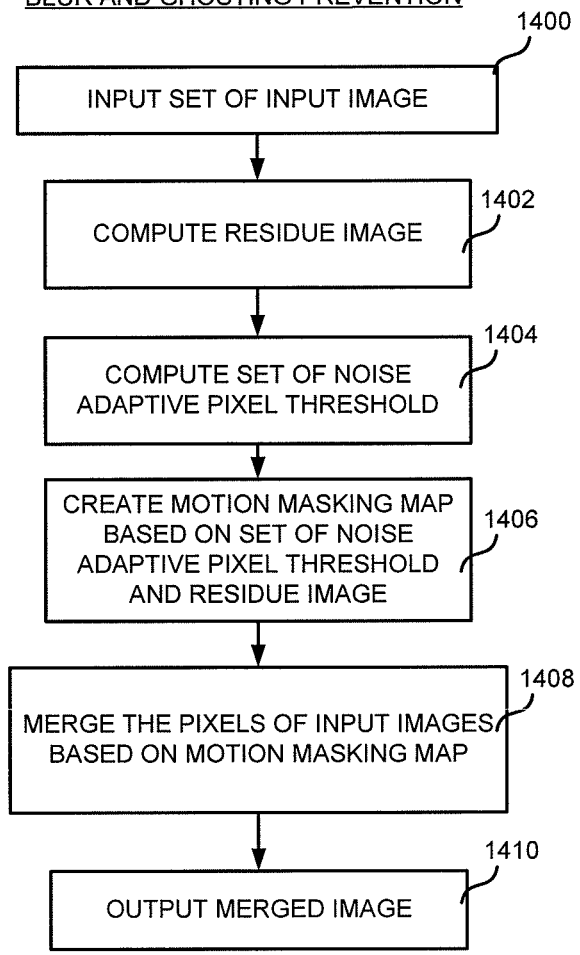
FIG. 14 is flow diagram illustrating the operation of the images merging processor with motion blur and ghosting prevention in accordance with the current invention.

Referring to FIG. 14, a flow diagram illustrating the operation for generating the output image of the images merging processor with motion blur and ghosting prevention (1230) in accordance with the current invention is shown. At step 1400, the method begins by inputting an input image set containing a plurality of raw images having same exposure. Next, the method computes the residue image at step 1402. The residue image is computed from a set of image difference. The set of image difference contains the difference of images computing an absolute difference of each image pair. A spatial-temporal filter is applied to the difference of images to obtain the residue image. Then, the method computes a set of noise adaptive pixel threshold based on sensor noise statistic and input images intensities at step 1404. The set of noise adaptive pixel threshold is obtained based on noise variance of each of pixel intensity of the input images. After that, the method creates a motion masking map using the residue image and the set of noise adaptive pixel threshold at step 1406. The motion masking map is used to represent the motion and non-motion pixels in the plurality of input images. At step 1408, the method merges the pixels from the plurality of input images to generate the output image with considering the motion pixels of the plurality of input images based on the motion masking map and pixel saturation level. The advantage of considering the motion pixels in merging the pixels is that the output image will not suffer from the artifacts (e.g. motion blur and ghosting artifacts) caused by these motion pixels. Finally, the method outputs the output image at step 1410. The output image has no or less motion blur and ghosting artifacts.

Residue Image Computation Module (1300)

Figure 15:
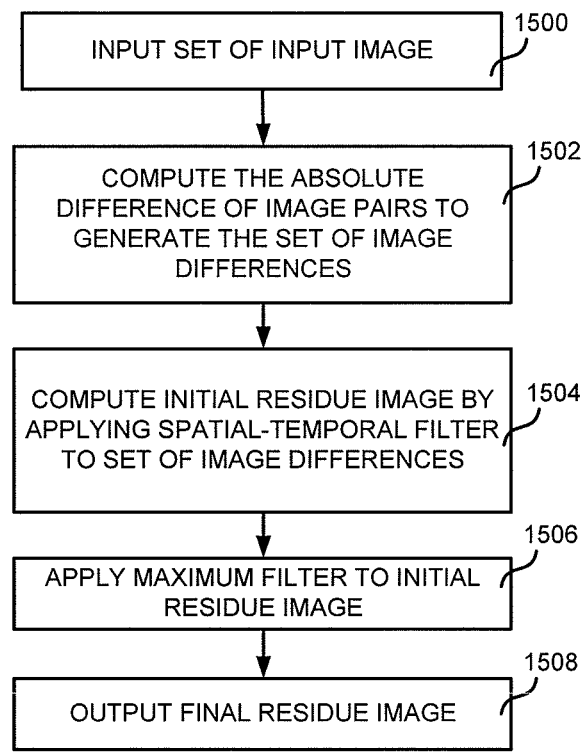
FIG. 15 is a flow diagram illustrating the operation of the residual image computation module in the images merging processor.

FIG. 15 is a flow diagram illustrating the operation of the residue image computation module (1300) of the imaging apparatus (images merging processor with motion blur and ghosting prevention (1230) shown in FIG. 13A) and method shown in FIG. 14. The residue image plays a crucial role for creating the motion masking map which is used in merging the pixels for generating the output image that has no or less motion blur and ghosting artifacts. The residue image is used to identify the motion and non-motion pixels among images of the plurality of input images with the noise adaptive pixel threshold. The plurality of input images may be captured at different time sequentially. With scene motion, same object in the scene may appear in different position among the images even if the images are captured with the same exposure. This causes blurring and ghosting artifacts in the output image.

Specifically, referring to FIG. 15, the residue image computation method begins by inputting a set of images containing the plurality of raw images, step 1500. Then, an absolute difference of image pair is computed at step 502 to generate a set of image difference. First, the input images are paired. The number of image pairs can be computed as $\Sigma_{p=1}^{n}(n-p)$, where n is the number of image in the plurality of input images. The absolute difference of each image pair is then computed. For example, if the input images contain 3 images, frame 0, frame 1, and frame 2. There are 3 image pairs, (0, 1), (1, 2), and (0, 2), respectively. Let I0, I1, I2 be the input images. The absolute difference for each pixel location (i, j) and for each image pair can be computed as follows $$D_0(i,j)=|I_0(i,j)-I_1(i,j)|,$$

$$D_1(i,j)=|I_1(i,j)-I_2(i,j)|,$$

$$D_2(i,j)=|I_0(i,j)-I_2(i,j)|, \qquad (8)$$

where D0, D1, and D2 are image differences of image pairs (0,1), (1,2), and (0,2), respectively, called "set of image difference". The || is an absolute operator.

In the current invention method, at step 1504, an initial residue image is generated using spatial-temporal filter applied to the set of image difference. Spatial filter is applied to each of image difference. Then, temporal filter is applied. Spatial filter can be any kinds of spatial filter kernels, for example Gaussian filters, Hanning filter, etc, and can be circular or rectangular filter. An example for generating the initial residue image from 3 image differences using spatial-temporal average filter is given below. Let Res(i,j) be the initial residue image at each pixel location(i,j). The Res(i,j) can be computed, for example, as $$Res(i, j) = \frac{1}{3}\sum_{m=-1}^{1}\sum_{n=-1}^{1} D_0(i+m, j+n) + \frac{1}{3}\sum_{m=-1}^{1}\sum_{n=-1}^{1} D_1(i+m, j+n) + \frac{1}{3}\sum_{m=-1}^{1}\sum_{n=-1}^{1} D_2(i+m, j+n) \qquad (9)$$

Equations (8) and (9) can be modified and extended for more number of images in input image set. It is not limited only for 3 images in input image set.

In general, the input images are mostly captured with short exposure and high camera gain to avoid motion blur. It is possible that the input images are noisy. The current invention applies the spatial-temporal filter to the set of image different. Spatial filter makes the method robust to spatial noise from image sensor. Temporal filter makes the method robust to temporal and inconsistency noises.

In case of the plurality of input images contain 2 images. The absolute difference can be computed from one image pair. The spatial filter can be applied to generate the initial residue image. The temporal filter can be omitted.

Figure 16:
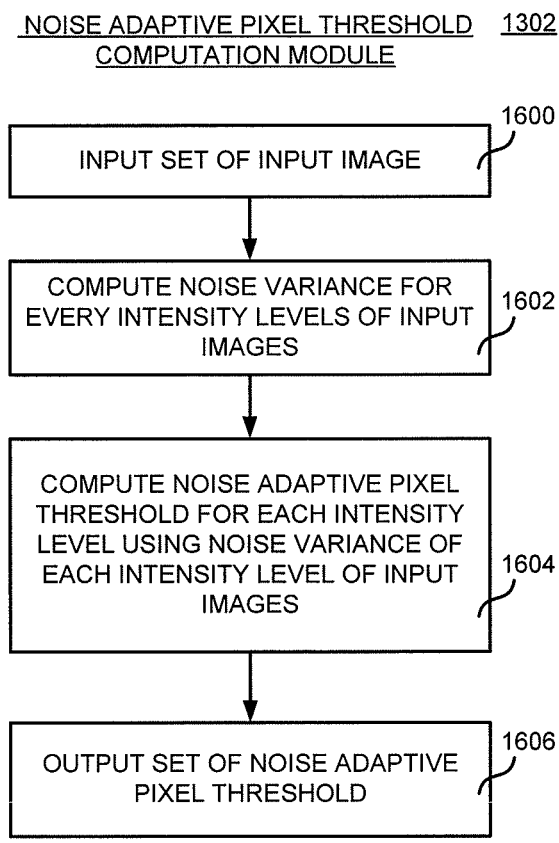
FIG. 16 is a flow diagram illustrating the operation of the noise adaptive pixel computation module in the images merging processor.

At step 1506, the maximum filter is applied to the initial residue image. Then the final residue image is obtained. The purpose of this step is to prevent noise and un-connectivity around the edges of the motion areas. This increases robustness of the current method. Maximum filter can be any shapes and any sizes. For example, if the maximum filter is rectangular window size of 7×7 pixels, the output of the pixel located in the window is the maximum of pixel value in the window. The window will slide to the next pixel one by one pixel for all the pixels in the initial residue image. Finally, step 1508 outputs the final residual image. This final residue image is then used to identify motion pixels with the set of noise adaptive pixel threshold in motion masking map creation. Noise Adaptive Pixel Threshold Computation Module (1302) FIG. 16 is a flow diagram illustrating the operation of a noise adaptive pixel threshold computation module (1302) of the imaging apparatus (images merging processor with motion blur and ghosting prevention (1230) shown in FIG. 13A) and method shown in FIG. 14. The method begins by inputting a set of images containing the plurality of raw images at step 1600. The noise variance of the input raw images is computed for each of intensity level at step 1602. The noise variance can be computed in various ways. It is preferably to compute the noise variance based on sensor noise statistics using noise model. Therefore, the noise variance of input raw images is independent on image contents. The sensor noise statistics may be modeled as $$\sigma_s^2 = \alpha I + \beta \qquad (10)$$

where $\alpha$ and $\beta$ are the parameters representing photon noise and dark noise, respectively, and can be obtained from sensor calibration. I is the pixel intensity. Once the noise variance of input raw images for each of intensity level is known, a noise adaptive pixel threshold can be computed at step 1604. It is computed for every pixel positions. An example of computing the noise adaptive pixel threshold (NAThr) at pixel position (i,j) for the plurality of input images containing n+1 images is given below $$NAThr(i,j)=k[w_0\sigma_0^{(i,j)}+w_1\sigma_1^{(i,j)}+w_2\sigma_2^{(i,j)}+\ldots+w_n\sigma_n^{(i,j)}], \qquad (11)$$

where $\sigma_n^{(i,j)}$ is the noise standard deviation of the pixel located at position (i,j) of input image frame n th. $w_n$ is the weight used to control the contribution of noise of image frame n th and $w_n$ can be varied from 0 to 1. k is the parameter used to control the threshold level which is based on the cumulative area of noise distribution.

Once the noise adaptive pixel threshold for each pixel is computed, the method outputs the set of noise adaptive pixel threshold at step 1606. The set of noise adaptive pixel threshold is used in the motion masking map creation.
Motion Masking Map Creation Module (1304)

Figure 17:
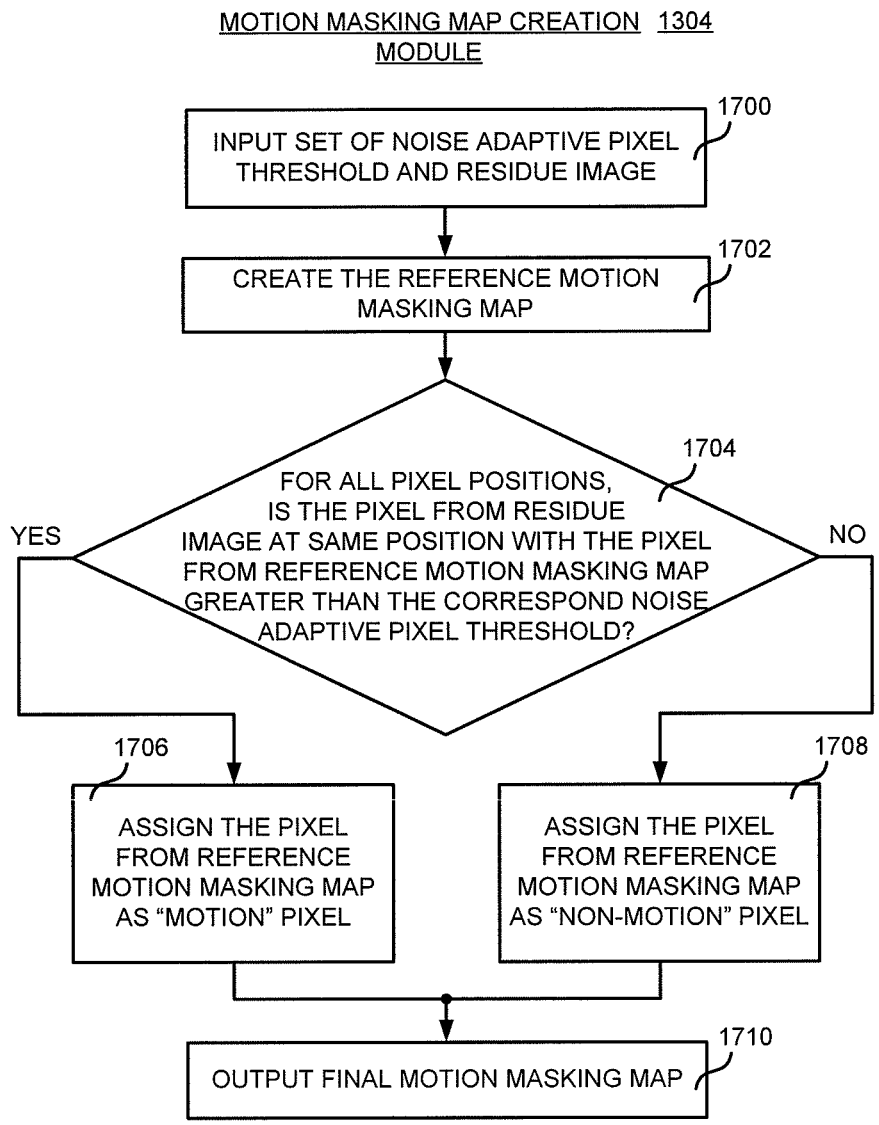
FIG. 17 is a flow diagram illustrating the operation of the motion masking map creation module in the images merging processor.

FIG. 17 is a flow diagram illustrating the operation of a motion masking map creation module (1304) of the imaging apparatus (images merging processor with motion blur and ghosting prevention (1230) shown in FIG. 13A) and method shown in FIG. 14. The method begins by inputting the set of noise adaptive pixel threshold and the residue image step 1700. Then, the method creates a reference motion masking map at step 1702. The residue image and the set of adaptive pixel threshold are compared for every pixel positions at step 1704. At each pixel position, if the pixel value from the residue image is greater than the noise adaptive pixel threshold at the same position, the method assigns the pixel from the reference motion masking map at the same position as "MOTION" pixel at step 1706. If the pixel value from the residue image is greater than the noise adaptive pixel threshold at the same position, the method assigns the pixel from the reference motion masking map at the same position as "NON-MOTION" pixel at step 1708. After all pixel positions from the residue image are compared and all pixel positions from the reference motion masking map are assigned, the method outputs the final motion masking map at step 1710.

The motion masking map is used in pixels merging. It represents motion and non-motion pixels among the input images.

Pixels Merging Module (1308)

Figure 18:
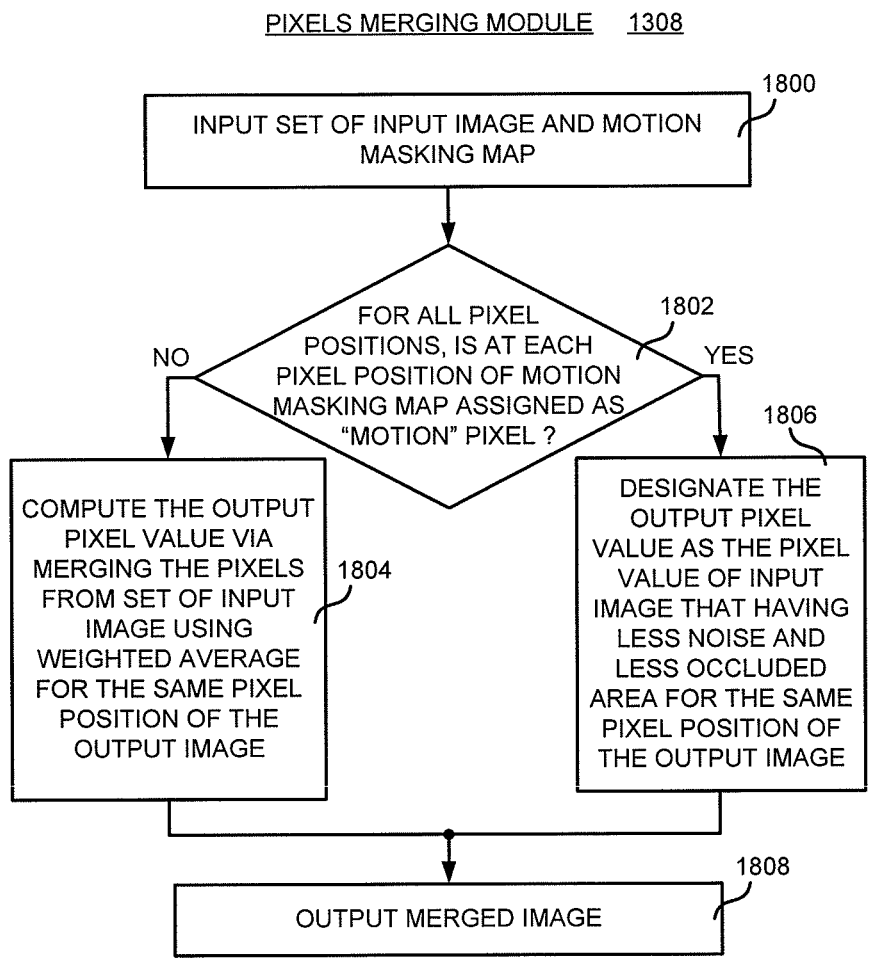
FIG. 18 is a flow diagram illustrating the operation of the pixels merging module in the images merging processor.

FIG. 18 is a flow diagram illustrating the operation of pixels merging module (1308) of the imaging apparatus (images merging processor with motion blur and ghosting prevention (1230) shown in FIG. 13A) and method shown in FIG. 14. The plurality of input raw images are merged together to obtain an output image. In case of motion occur, the motion pixels are performed separately. The motion pixels are represented by the motion masking map. Therefore, the resulting output image with no or less motion blur and ghosting artifacts can be obtained.

The plurality of input raw image may be filtered by low pass filter to reduce the image noise.

Referring to FIG. 18, at step 1800, the method inputs the plurality of raw images having same exposure and the motion masking map created from the motion masking map creation module (1304). At step 1802, for each pixel position, the pixel from the motion masking map at the same position is checked whether this position has been assigned as "MOTION" pixel. If the pixel from the motion masking map at the same position is assigned as "MOTION" pixel, then the pixel value of the output image at the same position is designated as the pixel value from the input image that having less noisy and less occluded areas at step 1806.

If the pixel from the motion masking map at the same position is not assigned as "MOTION" pixel, then the pixel value of the output image at the same position can be computed via merging all pixels from the input images using weighted average at step 1804 as follows $$\text{Output}(i,j) = g_0 I_0(i,j) + g_1 I_1(i,j) + g_2 I_2(i,j) + \ldots + g_n I_n(i,j), \quad (12)$$

where $g_n$ is the weight for the image $I_n$. The weights can be computed in various ways. An example of computing the weights based on averaging technique is given bellows.

$$g_n = \frac{1}{n} \quad (13)$$

However, the other techniques can be used for computing the weights. It is still in the same scope of this invention.

Figure 12B:
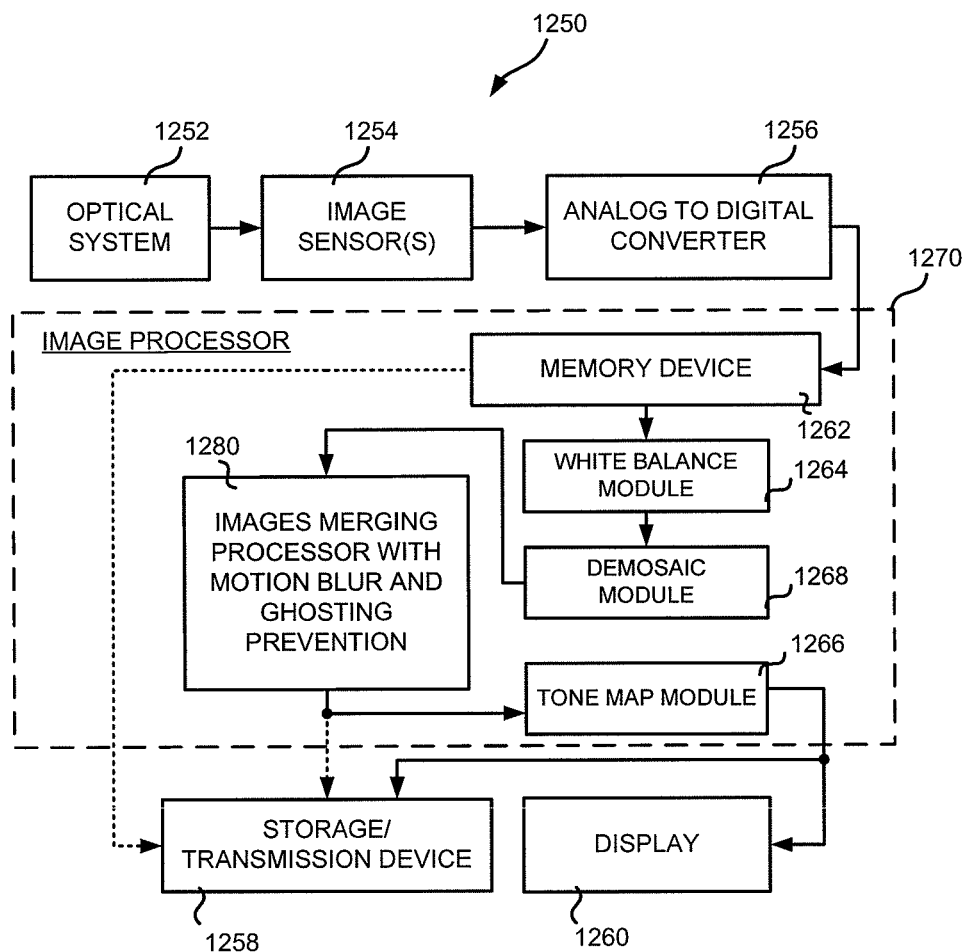
FIG. 12B is the another diagrams depicting the imaging apparatus.

When the pixel value of the output image is computed for every pixel position, the output image is output at step 1808. The output image is in Bayer raw format. The method and apparatus described above is performed in Bayer raw domain. It can also be applied in RGB domain. Referring to FIG. 12B, a block diagram of an imaging apparatus (1250) according to the second embodiment of the current invention is shown. The imaging apparatus (1250) consists of optical system (1252), image sensor/s (1254), analog-to-digital converter (1256), image processor (1270), storage/transmission device (1258), and display (260). The image processor (1270) consists of memory device (1262), images merging processor with motion blur and ghosting prevention (1280), white balance module (1264), tone map module (1266), and demosaic module (1268). The optical system (1252) may be consisting of components such as lenses, shutters, aperture, zoom/focus mechanism, and prisms, etc, for controlling the light signal reaching the image sensor (1254). The image sensor (1254) converts the light signal into electrical signal, which is converted by the analog-to-digital converter (1256) into digital data, and stored in the memory device (1262). The raw images from the memory device (1262) are processed by the white balance module (1264) and demosaic module (1268), resulting the RGB images which have 3 color components per pixel. The RGB images are passed to the images merging processor with motion blur and ghosting prevention (1280) to generate an output image. The R, G, and B color components can be process separately. The output image can be stored or transmitted by the storage/transmission device (1258). It can also be processed by the tone map module (1266), resulting in suitable range for showing on the display (1260) or storage/transmission by storage/transmission device (1258).

Figure 13B:
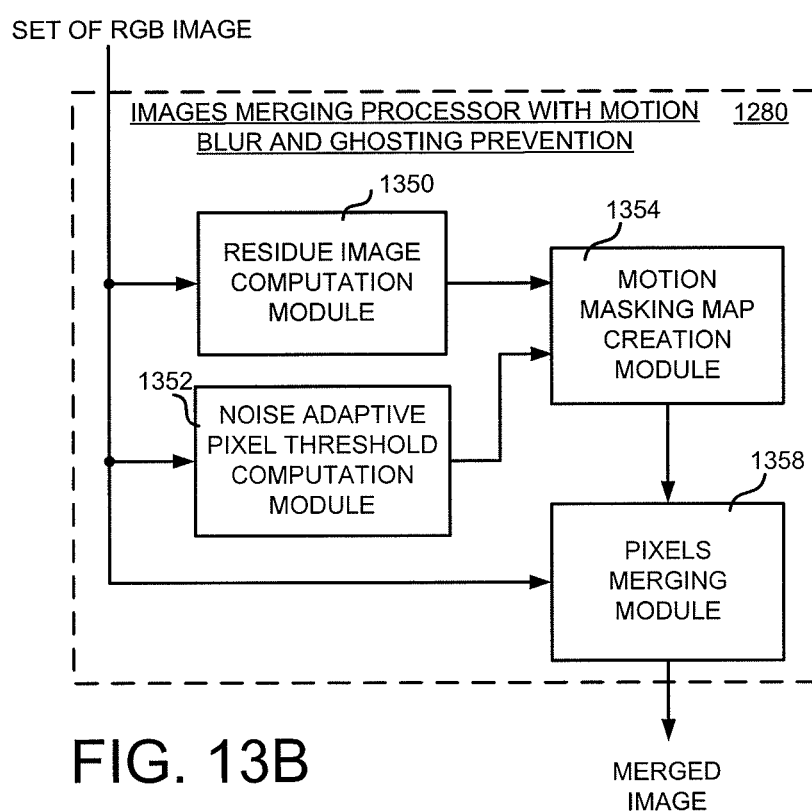

Referring to FIG. 13B, the detail block diagram of the images merging processor with motion blur and ghosting prevention (1280) of the imaging apparatus (1250) according to the second embodiment of the current invention is shown. The images merging processor with motion blur and ghosting prevention (1280) consists of a residue image computation module (1350), a noise adaptive pixel threshold computation module (1352), a motion masking map creation module (1354), and a pixels merging module (1358). The images merging processor with motion blur and ghosting prevention (1280) takes in the plurality of RGB images having same exposure. The residue image computation module (1350) computes the residue image from a set of image difference. Since the RGB image contains 3 color components per pixel, the set of image difference can be computed for each of color component separately using the method and apparatus described above according to the second embodiment of the current invention. To reduce complexity, it is preferably computed the set of image difference for G (green) color component only. The residue image can be computed from the set of image difference of G color component. The noise adaptive pixel threshold computation module (1352) computes a set of noise adaptive pixel threshold based on image sensor noise statistics using noise model from each of pixel intensity. The intensity of only G color component will be used. The motion masking map creation module (1354) creates a motion masking map using the residue image and the set of noise adaptive pixel threshold using the method and apparatus described above. The pixels merging module (1358) merges the pixels of the plurality of RGB images based on the motion masking map to generate an output image. The R, G, and B are performed separately. The method and apparatus for pixels merging described above according to the second embodiment of the current invention can be used.

The invention claimed is:

1. A method for motion blur and ghosting prevention in an imaging system, comprising:
    inputting an input image set containing a plurality of Bayer raw images, the plurality of Bayer raw images having different exposures;
    computing an absolute difference of image pairs in radiance domain to generate a set of image differences;
    computing an initial residue image using a spatial-temporal filter with the set of image differences;
    applying a maximum filter to the initial residue image to obtain a residue image;
    computing the residue image from the plurality of Bayer raw images;
    computing a noise adaptive pixel threshold set from the plurality of Bayer raw images;
    creating a motion masking map for one of assigning and not assigning each pixel position as "MOTION" using the residue image and the noise adaptive pixel threshold set;
    merging pixels from the input image set if the motion masking map at the pixel position is not assigned "MOTION";
    designating a pixel value of an input image of the input image set if the motion masking map at the pixel position is assigned "MOTION"; and selecting one of said merging and said designating based on the motion masking map at each pixel position to generate an output image.

2. The method of claim 1, further comprising:
computing a noise variance for each intensity level of the input image set; and
computing a noise adaptive pixel threshold for each intensity level based on the noise variance of each intensity level of the input image set for computing the noise adaptive pixel threshold set.

3. The method of claim 1, further comprising:
creating a reference motion masking map;
for each pixel position, comparing a pixel value from the residue image with a corresponding noise adaptive pixel threshold;
if the pixel value from the residue image is greater than the corresponding noise adaptive pixel threshold, assigning the reference motion masking map at the pixel position as a "MOTION" pixel; and
if the pixel value from the residue image is not greater than the corresponding noise adaptive pixel threshold, assigning the reference motion masking map at the pixel position as a "NON-MOTION" pixel.

4. The method of claim 1, further comprising:
determining a pixel saturation level of the input image set;
for each pixel position, comparing pixel values from the input image set with the pixel saturation level;
if none of the pixel values from the input image set at the pixel position is below the pixel saturation level, computing a radiance value from an image of the input image set that has a shortest exposure level for the pixel position of the output image;
if all of the pixel values from the input image set at the pixel position is below the pixel saturation level, checking the motion masking map at the pixel position; if the pixel position is not a "MOTION" pixel, computing the radiance value via merging the pixels from the input image set using a weighted average based on exposures for the pixel position of the output image; and if the pixel position is the "MOTION" pixel, computing the radiance value from an image of the input image set that has no motion blur for the pixel position of the output image; and
if at least one of the pixel values from the input image set at the pixel position is below the pixel saturation level, checking the motion masking map at the pixel position; if the pixel position is not the "MOTION" pixel, computing the radiance value via merging the pixels from at least one image of the input image set using a weighted average based on exposures for the pixel position of the output image; and if the pixel position is the "MOTION" pixel, computing the radiance value from an image of the input image set that has no motion blur and that is below the pixel saturation level for the pixel position of the output image.

5. The method of claim 1, wherein the pixel value of the input image of the input image set that is designated when the motion masking map at the pixel position is assigned "MOTION" is defined as a pixel value of the input image of the input image set that has no motion blur.

6. A method for motion blur and ghosting prevention in an imaging system, comprising:
inputting an input image set containing a plurality of RGB images, the plurality of RGB images having different exposures;
computing an absolute difference of image pairs in radiance domain to generate a set of image differences;
computing an initial residue image using a spatial-temporal filter with the set of image differences;
applying a maximum filter to the initial residue image to obtain a residue image;
computing the residue image from the plurality of RGB images;
computing a noise adaptive pixel threshold set from the plurality of RGB images;
creating a motion masking map for one of assigning and not assigning each pixel position as "MOTION" using the residue image and the noise adaptive pixel threshold set;
merging pixels from the input image set if the motion masking map at the pixel position is not assigned "MOTION";
designating a pixel value of an input image of the input image set if the motion masking map at the pixel position is assigned "MOTION"; and
selecting one of said merging and said designating based on the motion masking map at each pixel position to generate an output image.

7. The method of claim 6, further comprising:
computing a noise variance for each intensity level of the input image set; and
computing a noise adaptive pixel threshold for each intensity level based on the noise variance of each intensity level of the input image set for computing the noise adaptive pixel threshold set.

8. The method of claim 6, further comprising:
creating a reference motion masking map;
for each pixel position, comparing a pixel value from the residue image with a corresponding noise adaptive pixel threshold;
if the pixel value from the residue image is greater than the corresponding noise adaptive pixel threshold, assigning the reference motion masking map at the pixel position as a "MOTION" pixel; and
if the pixel value from the residue image is not greater than the corresponding noise adaptive pixel threshold, assigning the reference motion masking map at the pixel position as a "NON-MOTION" pixel.

9. The method of claim 6, further comprising:
determining a pixel saturation level of the input image set;
for each pixel position, comparing pixel values from the input image set with the pixel saturation level;
if none of the pixel values from the input image set at the pixel position is below the pixel saturation level, computing a radiance value from an image of the input image set that has a shortest exposure level for the pixel position of the output image;
if all of the pixel values from the input image set at the pixel position is below the pixel saturation level, checking the motion masking map at the pixel position; if the pixel position is not a "MOTION" pixel, computing the radiance value via merging the pixels from the input image set using a weighted average based on exposures for the pixel position of the output image; and if the pixel position is the "MOTION" pixel, computing the radiance value from an image of the input image set that has no motion blur for the pixel position of the output image; and
if at least one of the pixel values from the input image set at the pixel position is below the pixel saturation level, checking the motion masking map at the pixel position; if the pixel position is not the "MOTION" pixel, computing the radiance value via merging the pixels from at least one image of the input image set using a weighted average based on exposures for the pixel position of the output image; and if the pixel position is the "MOTION" pixel, computing the radiance value from an image of the input image set that has no motion blur and that is below the pixel saturation level for the pixel position of the output image.

10. The method of claim 6, wherein the pixel value of the input image of the input image set that is designated when the motion masking map at the pixel position is assigned "MOTION" is defined as a pixel value of the input image of the input image set that has no motion blur.

11. An apparatus for motion blur and ghosting prevention in an imaging system, comprising:
a processor; and
a memory storing instructions that, when executed by the processor, cause the processor to perform operations including:
inputting an input image set containing a plurality of Bayer raw images, the plurality of Bayer raw images having different exposures;
computing an absolute difference of image pairs in radiance domain to generate a set of image differences;
computing an initial residue image using a spatial-temporal filter with the set of image differences;
applying a maximum filter to the initial residue image to obtain a residue image; computing the residue image from the plurality of Bayer raw images;
computing a noise adaptive pixel threshold set from the plurality of Bayer raw images;
creating a motion masking map for one of assigning and not assigning each pixel position as "MOTION" using the residue image and the noise adaptive pixel threshold set;
merging pixels from the input image set if the motion masking map at the pixel position is not assigned "MOTION";
designating a pixel value of an input image of the input image set if the motion masking map at the pixel position is assigned "MOTION"; and
selecting one of the merging and the designating based on the motion masking map at each pixel position to generate an output image.

12. The apparatus of claim 11, wherein the operations further include:
computing a noise variance for each intensity level of the input image set; and
computing a noise adaptive pixel threshold for each intensity level based on the noise variance of each intensity level of the input image set for computing the noise adaptive pixel threshold set.

13. The apparatus of claim 11, wherein the operations further include:
creating a reference motion masking map;
for each pixel position, comparing a pixel value from the residue image with a corresponding noise adaptive pixel threshold;
if the pixel value from the residue image is greater than the corresponding noise adaptive pixel threshold, assigning the reference motion masking map at the pixel position as a "MOTION" pixel; and
if the pixel value from the residue image is not greater than the corresponding noise adaptive pixel threshold, assigning the reference motion masking map at the pixel position as a "NON-MOTION" pixel.

14. The apparatus of claim 11, wherein the operations further include:
determining a pixel saturation level of the input image set;
for each pixel position, comparing pixel values from the input image set with the pixel saturation level;
if none of the pixel values from the input image set at the pixel position is below the pixel saturation level, computing a radiance value from an image of the input image set that has a shortest exposure level for the pixel position of the output image;
if all of the pixel values from the input image set at the pixel position is below the pixel saturation level, checking the motion masking map at the pixel position; if the pixel position is not a "MOTION" pixel, computing the radiance value via merging the pixels from the input image set using a weighted average based on exposures for the pixel position of the output image; and if the pixel position is the "MOTION" pixel, computing the radiance value from an image of the input image set that has no motion blur for the pixel position of the output image; and
if at least one of the pixel values from the input image set at the pixel position is below the pixel saturation level, checking the motion masking map at the pixel position; if the pixel position is not the "MOTION" pixel, computing the radiance value via merging the pixels from at least one image of the input image set using a weighted average based on exposures for the pixel position of the output image; and if the pixel position is the "MOTION" pixel, computing the radiance value from an image of the input image set that has no motion blur and that is below the pixel saturation level for the pixel position of the output image.

15. The apparatus of claim 11, wherein the pixel value of the input image of the input image set that is designated when the motion masking map at the pixel position is assigned "MOTION" is defined as a pixel value of the input image of the input image set that has no motion blur.

16. An apparatus for motion blur and ghosting prevention in an imaging system, comprising:
a processor; and
a memory storing instructions that, when executed by the processor, cause the processor to perform operations including:
inputting an input image set containing a plurality of RGB images, the plurality of RGB images having different exposures;
computing an absolute difference of image pairs in radiance domain to generate a set of image differences;
computing an initial residue image using a spatial-temporal filter with the set of image differences;
applying a maximum filter to the initial residue image to obtain a residue image;
computing the residue image from the plurality of RGB images;
computing a noise adaptive pixel threshold set from the plurality of RGB images;
creating a motion masking map for one of assigning and not assigning each pixel position as "MOTION" using the residue image and the noise adaptive pixel threshold set;
merging pixels from the input image set if the motion masking map at the pixel position is not assigned "MOTION";
designating a pixel value of an input image of the input image set if the motion masking map at the pixel position is assigned "MOTION"; and selecting one of the merging and the designating based on the motion masking map at each pixel position to generate an output image.

17. The apparatus of claim 16, wherein the operations further include:
computing a noise variance for each intensity level of the input image set; and
computing a noise adaptive pixel threshold for each intensity level based on the noise variance of each intensity level of the input image set for computing the noise adaptive pixel threshold set.

18. The apparatus of claim 16, wherein the operations further include:
creating a reference motion masking map;
for each pixel position, comparing a pixel value from the residue image with a corresponding noise adaptive pixel threshold;
if the pixel value from the residue image is greater than the corresponding noise adaptive pixel threshold, assigning the reference motion masking map at the pixel position as a "MOTION" pixel; and
if the pixel value from the residue image is not greater than the corresponding noise adaptive pixel threshold, assigning the reference motion masking map at the pixel position as a "NON-MOTION" pixel.

19. The apparatus of claim 16, wherein the operations further include:
determining a pixel saturation level of the input image set;
for each pixel position, comparing pixel values from the input image set with the pixel saturation level;
if none of the pixel values from the input image set at the pixel position is below the pixel saturation level, computing a radiance value from an image of the input image set that has a shortest exposure level for the pixel position of the output image;
if all of the pixel values from the input image set at the pixel position is below the pixel saturation level, checking the motion masking map at the pixel position; if the pixel position is not a "MOTION" pixel, computing the radiance value via merging the pixels from the input image set using a weighted average based on exposures for the pixel position of the output image; and if the pixel position is the "MOTION" pixel, computing the radiance value from an image of the input image set that has no motion blur for the pixel position of the output image; and
if at least one of the pixel values from the input image set at the pixel position is below the pixel saturation level, checking the motion masking map at the pixel position; if the pixel position is not the "MOTION" pixel, computing the radiance value via merging the pixels from at least one image of the input image set using a weighted average based on exposures for the pixel position of the output image; and if the pixel position is the "MOTION" pixel, computing the radiance value from an image of the input image set that has no motion blur and that is below the pixel saturation level for the pixel position of the output image.

20. The apparatus of claim 16, wherein the pixel value of the input image of the input image set that is designated when the motion masking map at the pixel position is assigned "MOTION" is defined as a pixel value of the input image of the input image set that has no motion blur.

* * * * *